(12) United States Patent
Colding et al.

(10) Patent No.: US 11,833,401 B2
(45) Date of Patent: *Dec. 5, 2023

(54) COMPUTER IMPLEMENTED AMERICAN SOCCER TRAINING AND EVALUATION METHOD AND SYSTEM

(71) Applicant: GOAL STATION APS, Aalborg (DK)

(72) Inventors: Holger Colding, Aalborg (DK); Brian Sorensen, Aalborg (DK); John Andersen, Aalborg (DK); Lars Pedersen, Aalborg (DK)

(73) Assignee: GOAL STATION APS, Aalborg (DK)

( * ) Notice: Subject to any disclaimer, the term of this patent is extended or adjusted under 35 U.S.C. 154(b) by 0 days.

This patent is subject to a terminal disclaimer.

(21) Appl. No.: 17/984,509

(22) Filed: Nov. 10, 2022

(65) Prior Publication Data

US 2023/0112825 A1 Apr. 13, 2023

Related U.S. Application Data

(63) Continuation of application No. 17/054,093, filed as application No. PCT/US2019/031631 on May 9, 2019, now Pat. No. 11,534,671.
(Continued)

(51) Int. Cl.
*A63B 69/00* (2006.01)
*A63B 71/02* (2006.01)
(Continued)

(52) U.S. Cl.
CPC ........ *A63B 69/002* (2013.01); *A63B 24/0062* (2013.01); *A63B 63/004* (2013.01);
(Continued)

(58) Field of Classification Search
CPC ... A63B 69/002; A63B 69/0097; A63B 71/03; A63B 71/0616; A63B 24/0062;
(Continued)

(56) References Cited

U.S. PATENT DOCUMENTS 4,699,386 A * 10/1987 Carzino ................. A63B 63/06
473/431
5,660,550 A 8/1997 Roche
(Continued)

*Primary Examiner* — Allen Chan
(74) *Attorney, Agent, or Firm* — Schmeiser, Olsen & Watts, LLP

(57) ABSTRACT

A computer-implemented American soccer training and evaluation method that includes subjecting a drilling user to predefined drilling protocol(s) of a plurality of American soccer drilling assemblies and obtain, from each pre-defined drilling protocol(s) of the plurality of American soccer drilling assemblies and from at least one sensor on each of the assemblies, at least one user physical characteristic of the drilling user. The user physical characteristic is communicated to an administrative server over a network, where it is stored and used to create a drilling user performance profile having individualized performance comparisons with respect to the at least one user physical characteristic of the drilling user and a performance benchmark. Then, the drilling user performance profile is communicated to at least one of a plurality of electronic computing devices of a plurality of consuming users for evaluation and review.

8 Claims, 27 Drawing Sheets

Related U.S. Application Data

(60) Provisional application No. 62/669,204, filed on May 9, 2018.

(51) Int. Cl.
*A63B 24/00* (2006.01)
*A63B 63/00* (2006.01)
*A63B 71/06* (2006.01)
*H04L 67/12* (2022.01)
*H04L 67/306* (2022.01)

(52) U.S. Cl.
CPC ......... *A63B 69/0097* (2013.01); *A63B 71/03* (2020.08); *A63B 71/0616* (2013.01); *H04L 67/12* (2013.01); *H04L 67/306* (2013.01); *A63B 2024/0025* (2013.01); *A63B 2024/0028* (2013.01); *A63B 2210/50* (2013.01); *A63B 2214/00* (2020.08); *A63B 2220/62* (2013.01); *A63B 2220/833* (2013.01); *A63B 2220/836* (2013.01); *A63B 2225/20* (2013.01); *A63B 2225/50* (2013.01); *A63B 2243/0025* (2013.01)

(58) Field of Classification Search
CPC ............. A63B 63/004; A63B 2214/00; A63B 2220/62; A63B 2220/833; A63B 2220/836; A63B 2225/20; A63B 2225/50; A63B 2243/0025; A63B 2024/0025; A63B 2024/0028; A63B 2210/50; H04L 67/12; H04L 67/306

USPC ................................ 473/446, 471, 476, 478
See application file for complete search history.

(56) References Cited

U.S. PATENT DOCUMENTS

| | | | |
|---|---|---|---|
| 6,352,484 | B1 | 3/2002 | Killion |
| 6,439,572 | B1 | 8/2002 | Bowen |
| 6,846,253 | B1 | 1/2005 | Szwalek |
| 7,172,521 | B1 | 2/2007 | Novis |
| 8,550,063 | B2 | 10/2013 | Alger |
| 8,708,842 | B2 | 4/2014 | Ganuza |
| 8,882,612 | B2 | 11/2014 | Pinezich et al. |
| 9,278,270 | B2 | 3/2016 | Adema |
| 10,039,967 | B2 * | 8/2018 | Dunser .................. A63B 63/00 |
| 10,478,699 | B2 * | 11/2019 | Janssen .............. A63B 71/0622 |
| 2004/0132558 | A1 | 7/2004 | Rothman |
| 2004/0266563 | A1 | 12/2004 | Young |
| 2006/0189417 | A1 | 8/2006 | Evans et al. |
| 2008/0032826 | A1 | 2/2008 | Mubarak et al. |
| 2012/0052992 | A1 | 3/2012 | Uribe, III |
| 2012/0077628 | A1 | 3/2012 | Siefker |
| 2015/0005110 | A1 | 1/2015 | Adema |
| 2016/0016059 | A1 | 1/2016 | Martinez |
| 2016/0271448 | A1 | 9/2016 | Edelhaeusser |
| 2017/0095716 | A1 | 4/2017 | Lewis |
| 2018/0093160 | A1 | 4/2018 | Alhadeff |
| 2018/0099201 | A1 | 4/2018 | Marty |

* cited by examiner

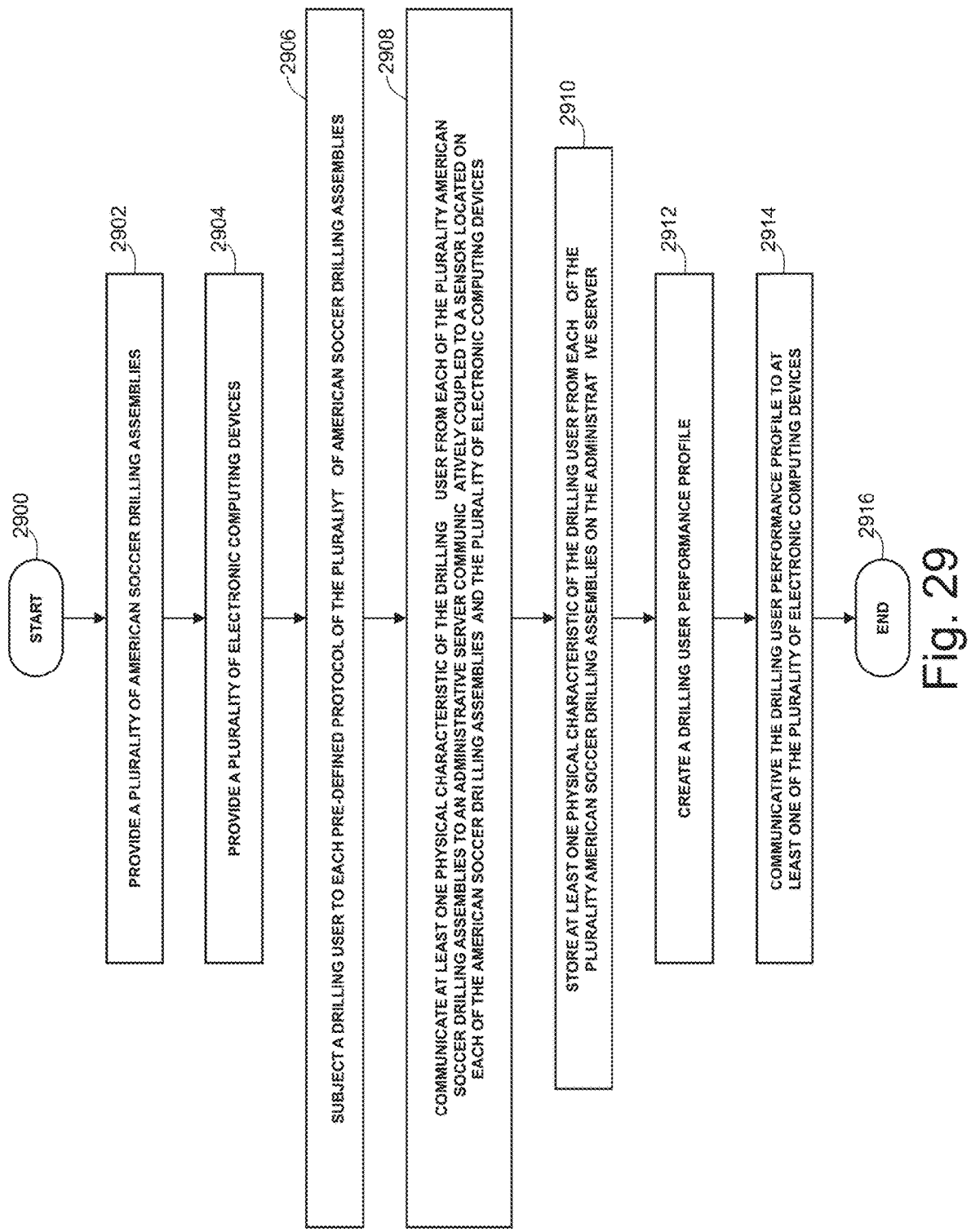

COMPUTER IMPLEMENTED AMERICAN SOCCER TRAINING AND EVALUATION METHOD AND SYSTEM

CROSS-REFERENCE TO RELATED APPLICATIONS

This application is a continuation of application Ser. No. 17/054,093, having a filing date of Nov. 9, 2020, which claims priority to PCT Application No. PCT/US2019/031631, having a filing date of May 9, 2019, which claims priority to U.S. Provisional Application No. 62/669,204, having a filing date of May 9, 2018, the entire contents all of which are hereby incorporated by reference.

FIELD TECHNOLOGY

The present invention relates generally to an American soccer training and evaluation method and system, and, more particularly, relates to a computer-implemented training and evaluation method for American soccer players using unique evaluation assemblies.

BACKGROUND

American soccer, among other sports, has obtained great popularity, world-wide. Evaluating the talent of (and/or training) American soccer players has become extremely competitive and, respect to the evaluation of players, difficult. To that end, many training and evaluation devices and methods have been developed. Many of these training and evaluation devices and methods, however, are inherently inaccurate, include facets of subjective bias, and are not able to be replicated for consistent evaluation results or shared among a number of players, or those individuals or entities governing or controlling the players.

Therefore, a need exists to overcome the problems with the prior art as discussed above.

SUMMARY

The invention provides a computer-implemented American soccer training and evaluation method and system that overcomes the hereinafore-mentioned disadvantages of the heretofore-known devices and methods of this general type and that enables the generation of consistent, reliable, and accurate evaluation or performance data. This performance data can be quickly and effectively shared with current or future individuals or entities governing or controlling players for, inter alia, gauging a player's development and/or performance.

Although the invention is illustrated and described herein as embodied in a computer-implemented American soccer training and evaluation method and system, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. The terms "program," "software application, "app" and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

BRIEF DESCRIPTION

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

FIG. 29 illustrates a process-flow diagram depicting a computer-implemented American soccer training and evaluation method in accordance with one embodiment of the present invention.

DETAILED DESCRIPTION

Figure 1:
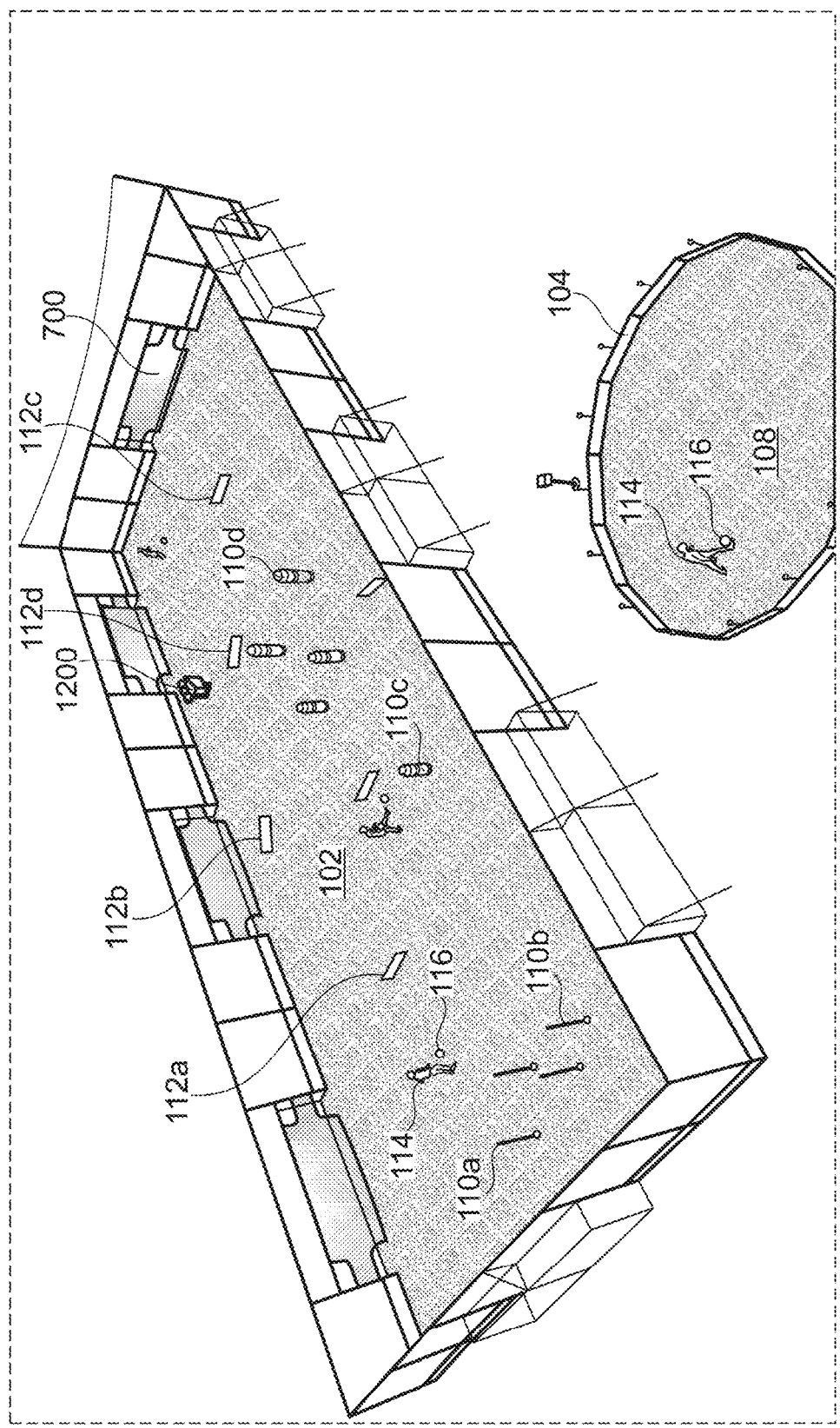
FIG. 1 is a perspective view of an exemplary American soccer training system controlled by an Athlete app and Web portals, in accordance with the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

With reference to FIG. 29 in combination with the other figures depicted and the specification disclosed herein, a computer-implemented American soccer training and evaluation method is depicted and disclosed. Although FIG. 29 shows a specific order of executing the process steps, the order of executing the steps may be changed relative to the order shown in certain embodiments. Also, two or more blocks shown in succession may be executed concurrently or with partial concurrence in some embodiments. Certain steps may also be omitted in FIG. 29 for the sake of brevity. In some embodiments, some or all of the process steps included in FIG. 29 can be combined into a single process.

Figure 28:
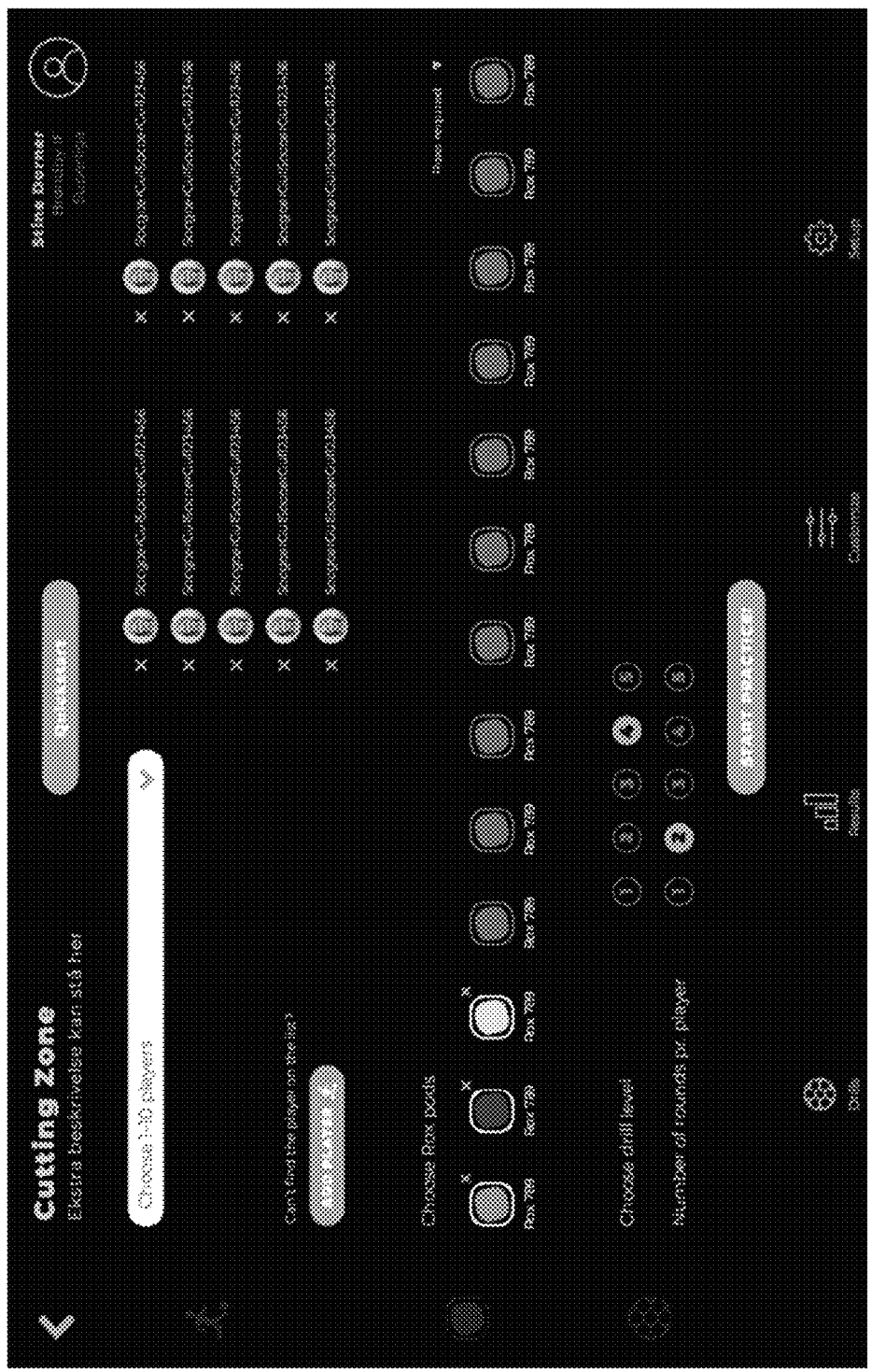
FIG. 28 illustrates another exemplary user-interface of a software application implemented to carry out one or more aspects of the present invention.

More specifically, in one exemplary embodiment, the process begins at step 2900 and immediately proceeds to the steps 2902, 2902 of providing a plurality of American soccer drilling assemblies for implementing the drilling, testing, or training process and a plurality of electronic computing devices of a plurality of consuming users, respectively. The plurality of American soccer drilling assemblies, as more fully discussed herein, are operably configured to be placed on a training field surface and each have a unique structural drilling configuration and a unique and pre-defined drilling protocol and at least one sensor operably coupled thereto for measuring player physical characteristics, e.g., a leg speed of the player, ball speed after kicked or headed by a player, a ball placement accuracy using marked targets, response time, and/or drilling protocol completion time (e.g., a player finishes a first drilling assembly, as exemplified in FIG. 3, in two minutes, but finishes another soccer drilling assembly, as exemplified in FIG. 6, in three minutes. Exemplary player physical characteristics obtained from each of the plurality of American soccer drilling assemblies can also be seen in FIG. 28.

The at least one sensor is operably configured to obtain at least one user physical characteristic and then communicate the at least one user physical characteristic to an administrative server, belonging to an administrator user, wherein the administrative server is communicatively coupled to the at least one sensor over a network. Each of the plurality of electronic computing devices may be provided (as defined herein) to the plurality of consuming users, wherein each of the plurality of electronic computing devices are communicatively coupled to the administrative server over the network. Again, the present invention is beneficial in that multiple coaches or controlling individuals and/or entities may access, monitor, review, and/or otherwise evaluate the player and his or her previous results, thereby gauging their performance or improvement.

The network includes connections over a communication network, which are the medium used to provide communication links between various devices and computers connected together within the network, including the equipment discussed herein, including the administrative server, the at least one sensor, and the plurality of electronic computing devices. The connections are preferably wireless connections but may in some limited embodiments be wired. A few exemplary wired connections are cable, phone line, and fiber optic. Exemplary wireless connections include radio frequency (RF) and infrared radiation (IR) transmission. Many other wired and wireless connections are known in the art and can be used with the present invention. The aforementioned devices may also be operably configured to execute programming instructions embodied in a software application, accessible on the device or web-based via a wide area network (WAN). Said another way, the software application may be resident on a device or a web-based software application, a desktop software application, or a mobile device software app that is directly accessible by a computer device. In one embodiment, the WAN is the Internet. The Internet represents a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, the network also may be implemented as a number of different types of networks, such as for example, an Intranet, a local area network (LAN), or a cellular network. Therefore, the device discussed herein may include a network interface(s) configured to connect to a wide area network (WAN) via a WAN interface. The WAN interface may permit a connection to a cellular mobile communications network. The WAN interface may include communications circuitry, such as an antenna coupled to a radio circuit having a transceiver for transmitting and receiving radio signals via the antenna. The radio circuit may be configured to operate in a mobile communications network, including but not limited to global systems for mobile communications (GSM), code division multiple access (CDMA), wideband CDMA (WCDMA), and the like.

Next, step 2906 includes subjecting a drilling user to each pre-defined drilling protocol of the plurality of American soccer drilling assemblies and obtain, from each pre-defined drilling protocol of the plurality of American soccer drilling assemblies and from the at least one sensor, the at least one user physical characteristic of the drilling user. Additionally, the process and system may include subjecting a plurality of drilling users to each pre-defined drilling protocol of the plurality of American soccer drilling assemblies and obtain, from each pre-defined drilling protocol of the plurality of American soccer drilling assemblies and from the at least one sensor, the at least one user physical characteristic of the plurality of drilling users, wherein each of the at least one user physical characteristic of the plurality of drilling users are utilized in determining the performance benchmark.

As such, multiple user types may have different features, i.e., drilling users (athletes or users), trainers and/or clubs (customers), and "GS" (administration). The system may be able to provide users with advanced reporting, wherein both users and customers will be provided with a broader range of reporting suited for their needs to evaluate performance over time, team etc. Additionally, the users will get the option to benchmark their performance on official training drills with the other users across age groups, gender etc.

Additionally, the process and system may also include subjecting the drilling user to a first performance evaluation session that includes subjecting the drilling user to each pre-defined drilling protocol of the plurality of American soccer drilling assemblies and obtain, from each pre-defined drilling protocol of the plurality of American soccer drilling assemblies and from the at least one sensor, the at least one user physical characteristic of the drilling user obtained from each of the plurality of American soccer drilling assemblies in the first performance evaluation session is utilized in determining the performance benchmark for each of the plurality of American soccer drilling assemblies. At some point after the first performance evaluation session, the drilling user may be subjected to a second performance evaluation session that includes subjecting the drilling user to each, and the same from the first performance evaluation session, pre-defined drilling protocol of the plurality of American soccer drilling assemblies and obtain, from each pre-defined drilling protocol of the plurality of American soccer drilling assemblies and from the at least one sensor, the at least one user physical characteristic of the drilling user.

Figure 20:
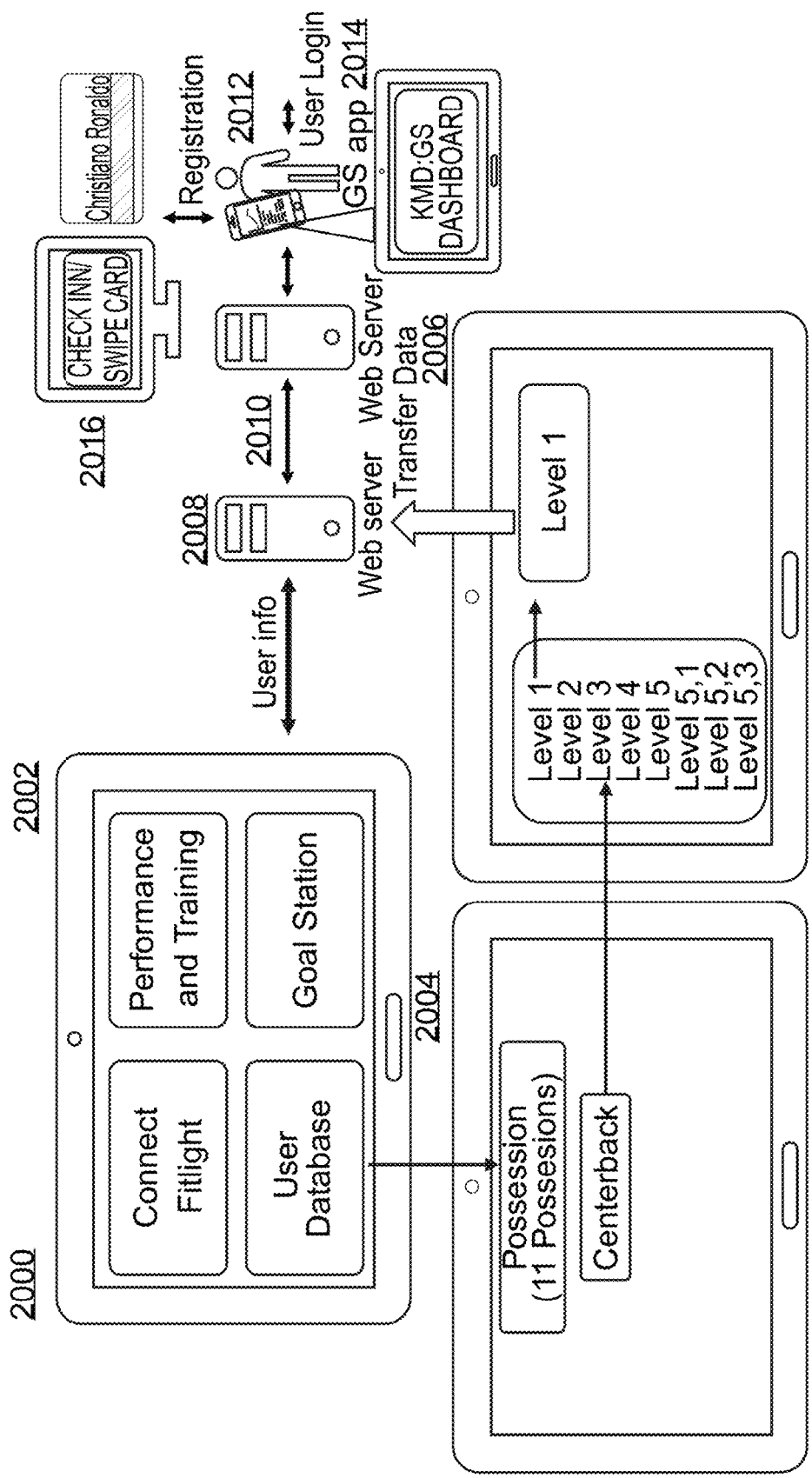
FIG. 20 illustrates an exemplary Athlete app and Web portal operable on a Goal Station Tablet, in accordance with the present invention.
Figure 21:
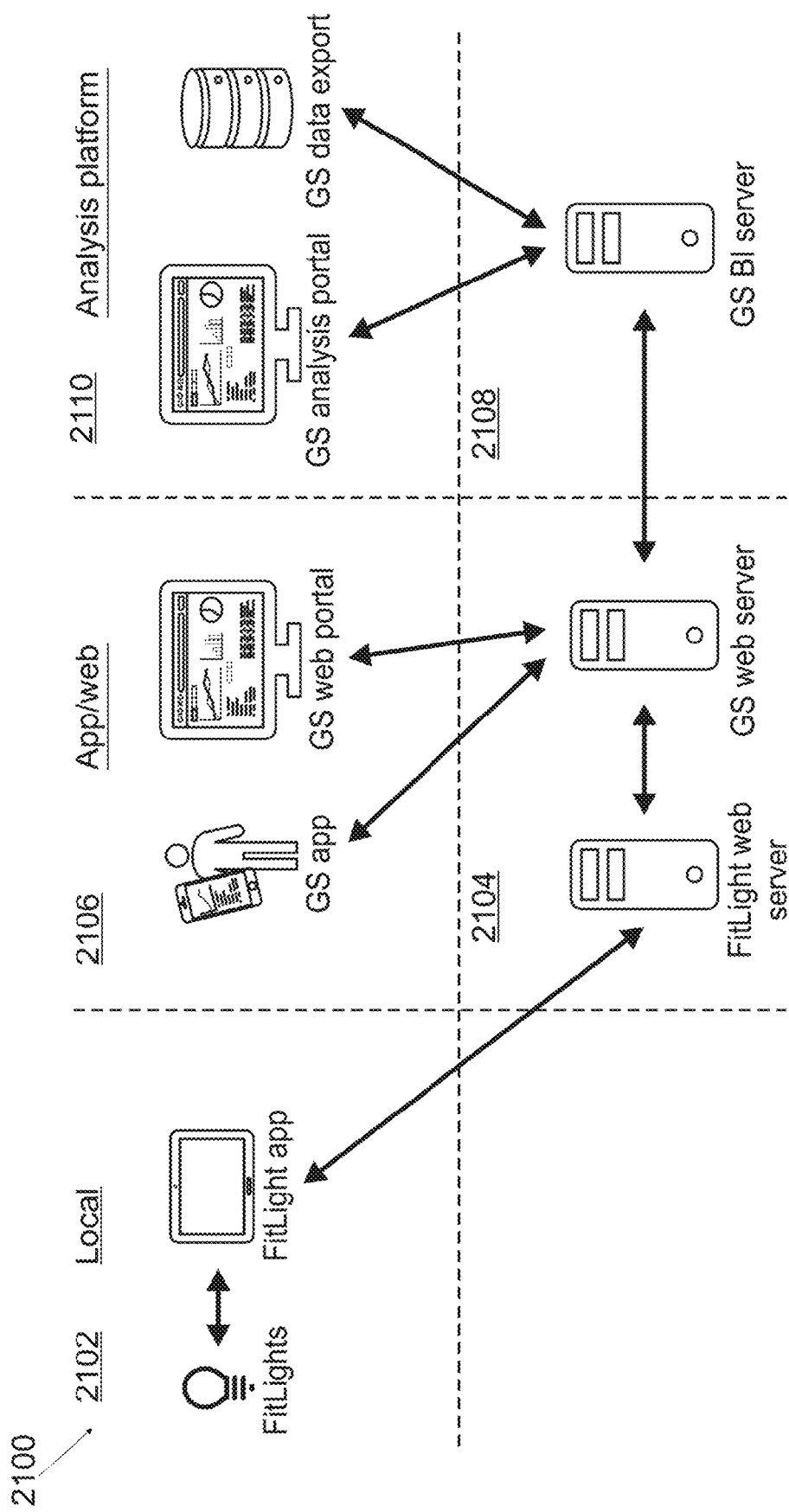
FIG. 21 illustrates an exemplary Architecture structure for the Athlete App and Web portals shown in FIG. 20, in accordance with the present invention.
Figure 27:
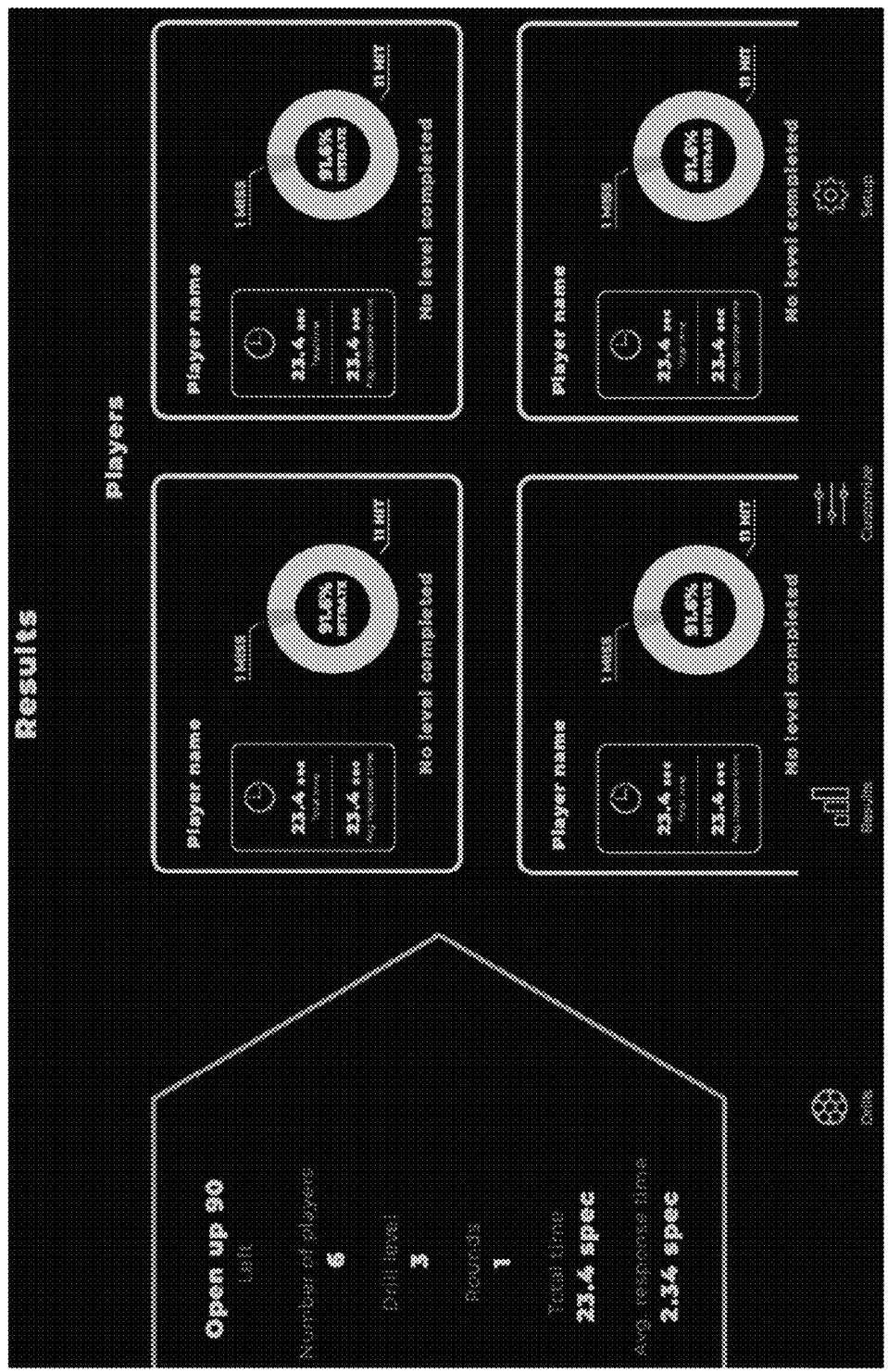
FIG. 27 illustrates another exemplary user-interface of a software application implemented to carry out one or more aspects of the present invention.

Step 1908 includes communicating the at least one user physical characteristic of the drilling user from each of the plurality of American soccer drilling assemblies to the administrative server over the network (as can be seen in FIGS. 20-21). Next, step 1910 includes storing the at least one user physical characteristic of the drilling user from each of the plurality of American soccer drilling assemblies on the server. Step 1912 may include creating a drilling user performance profile having individualized performance comparisons with respect to the at least one user physical characteristic of the drilling user obtained from each of the plurality of American soccer drilling assemblies and a performance benchmark. Thereafter, step 1914 includes communicating the drilling user performance profile of the drilling user to at least one of the plurality of electronic computing devices of the plurality of consuming users. An exemplary performance profile seen on a graphical user interface (GUI) can be seen best depicted in FIG. 27. The process may terminate at step 1916.

A novel and efficient American soccer training system 100 and method that helps a player 114 develop soccer skills and techniques, while also allowing a coach to focus on more important details of training the player 114. Embodiments of the invention provide a playing field 102 containing various types of modular training equipment that is strategically arranged thereon. The modular training equipment includes a plurality of mobile barriers 110*a-d*, 112*a-e*, illuminating targets 800*a-d*, a restricted goal assembly 700, a variable speed and trajectory ball serving assembly 1200, a pool game pen 1400, and other ball handling games and exercises.

An Athlete app 2000 and Web portals enable control and viewing of the training data to synchronize the lighting pattern of the illuminating targets with the training equipment and/or the player's skillset and capacity (this may clone by using process(es) and equipment commercially advertised under the name "FitLight," but the present invention is not limited to said process(es) and equipment as equivalent process(es) and structure(es) may be utilized without deviating from the spirt and scope of the present invention). The Athlete app is viewable on a Goal Station Tablet by the player 114, coach, and manager. The Athlete app 2000 works with various Web portals to display the training data in a structured fashion that allows for optimal manipulation of the FitLight and other training equipment.

The modular configuration of the training equipment allows for different combinations of training equipment to be used in conjunction, or independently of each other; thereby allowing for customizable and creative training techniques. Further, the modular training equipment may be arranged in at least one strategic soccer position across the playing field 102, so as to help the player 114 develop soccer-related motor skills and techniques required for optimal playing performance.

In addition, embodiments of the invention enable the position and motion of the player 114 and the ball 116 to be tracked through use of at least one sensor (not shown) that monitors the player 114 and the ball 116 relative to each other, and relative to the modular training equipment. The sensor detects the motion and position of the player and ball to derive data, attributes, and characteristics of the player 114. The data, attributes, and characteristics are stored in a remote data storage device for analysis, distribution, and to help develop a customized training program for the player 114.

Referring now to FIG. 1, one embodiment of the present invention is shown in a perspective view. FIG. 1 shows several advantageous features of the present invention, but, as will be described below, the invention can be provided in several shapes, sizes, combinations of features and components, and varying numbers and functions of the components.

The first example of an American soccer training system 100, as shown in FIG. 1, includes a soccer training facility useful for training a player 114 about the fundamentals and advanced techniques used in the game of American soccer, or "football", as referred to internationally. The soccer training facility includes a playing field 102 that provides a sufficient area for implementation of the system 100 and for training the player 114 in American soccer.

In some embodiments, the playing field 102 has dispersed therein, various types of modular training equipment that are strategically arranged on the playing field 102. The modular training equipment is strategically arranged on the playing field 102 to help the player 114 develop soccer-related motor skills and techniques required for optimal soccer performance. The modular training equipment may include, without limitation, a plurality of vertical and horizontal mobile barriers 1 110a-d, 112a-f, illuminating targets 800a-d, a restricted goal assembly 700, a variable speed and trajectory ball serving assembly 1200, a pool game pen 1400, and other ball handling games and exercises. The modular training equipment trains the player to rebound the ball 116, shoot the ball 116, serve the ball 116, and also matriculate with or without the ball through challenging obstacles that develop specific soccer skills.

The different modular training equipment can work independently, or together to create a unique soccer training synergy. The lightweight and modular configuration of the modular training equipment allows a single person, such as a coach, or the player 114, to reconfigure the arrangement quickly and with minimal tools or skillset. The modular training equipment can be arranged into at least one strategic soccer position across the playing field 102. One non-limiting example of an arranged strategic soccer position is a defensive soccer position consisting of vertical and/or horizontal barriers 110a-d, 112a-e through which the player 114 matriculates the ball 116, with the objective to shoot the ball 116 towards a restricted goal assembly 700. The ball serving assembly 1200 may also be used to pass the ball 116 to the player 114 while the player 114 is moving through the barriers, or in proximity to the restricted goal assembly 700.

In some embodiments, the system 100 provides a player and ball tracking component that allows the position and movement of the player 114 and the ball 116 to be digitized into data for controlling the modular training equipment, and also for storage and analysis of the data. The system 100 utilizes at least one sensor that monitors the player 114 and the ball 116 to derive data, attributes, and characteristics of the motion and position of the player 114 and the ball 116, relative to each other. The sensor also monitors the ball 116 and the player 114 relative to the modular training equipment. The data, attributes, and characteristics are stored in a remote data storage device for analysis, distribution, and to develop a customized training program for the player 114. This data can be used to further develop and customize the system 100 for the player 114.

One objective of the present invention is to provide a multi-functional American soccer training arena to facilitate the ideal training environment that is efficient, effective, and focused.

Another objective is to provide an American soccer training system 100 that utilizes a playing field 102 containing barriers, a restricted goal assembly 700, illuminating targets 800a-d, and a ball serving assembly 1200 accessible for a player 114 to develop soccer-related motor skills and techniques required for optimal soccer performance.

Another objective is to streamline team and individual training so the coach can focus on the quality of the content instead of time-wasting external factor.

Another objective is to create training for aerobic and anaerobic exercises, and technical, tactical (positional), and mental elements like orientation, decision making and reaction training.

Yet another objective is to enable the player 114 to measure progress through real-time data captured with the sensor, illuminating targets 800a-d, a ball rebounding corral 104, and a ball serving assembly 1200.

Yet another objective is to provide a plurality of illuminating targets 800a-d operational on the illuminating targets 800a-d and the ball rebounding corral 104 for position specific training, improving reaction training, vision, accelerating decision making and tracking progress of training.

Yet another objective is to enable the ball serving assembly 1200 to serve precise passes on the ground or in the air at various speeds, which allows for effortless precision of repetition.

Yet another objective is to allow the coach to focus on giving feedback instead of having the burden of participating in the training.

Figure 2:
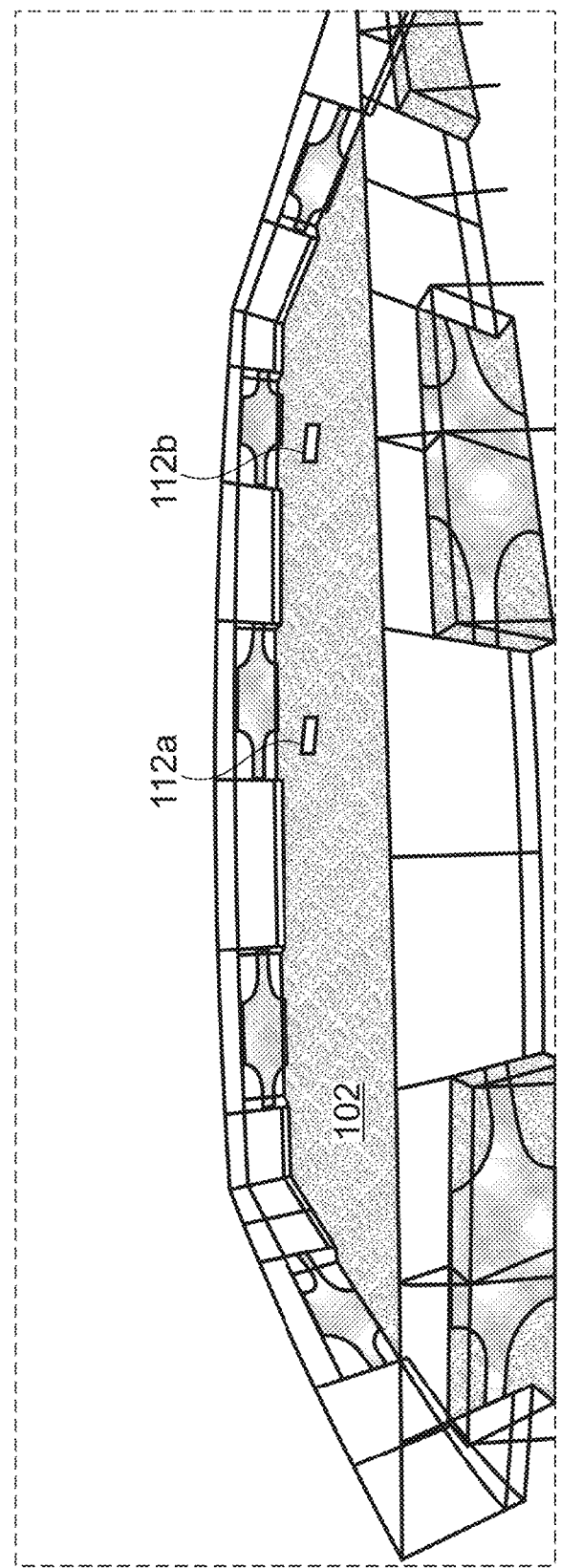
FIG. 2 is a perspective view of a playing field containing horizontal barriers, in accordance with the present invention.

In one non-limiting embodiment, referenced in FIG. 2, the American soccer training system 100, hereafter "system 100", comprises a playing field 102, such as a soccer field or football pitch, that is sized and dimensioned to enable at least one player 114 to train for, or play, a game of American soccer. In some embodiments, the playing field 102 may have a generally flat, rectangular shape, and be dimensioned about 44 meters×22 meters. Though in other embodiments, the dimensions of the playing field 102 are 105 meters×68 meters (115 yards×74 yards) with an area of 7,140 square meters. Though other sizes and dimensions may be used. Further, the playing field 102 may have artificial turf or natural grass as a playing surface.

As discussed above, the system 100 utilizes various modular training equipment that can be arranged on the playing field 102. The modular training equipment is arranged in at least one strategic soccer position across the playing field 102. In one embodiment shown in FIG. 3, the modular training equipment includes a ball rebounding corral 104 that helps the player 114 develop ball passing and dribbling skills by simulating passing and receiving the ball 116 from a teammate.

In some embodiments, the ball rebounding corral 104 may include a plurality of wall modules 200a-f arranged in a closed-angular 360° closed loop, slightly angular pattern that forms a slightly elongated enclosed region 108. The wall modules 200a-f may fasten together at their edges through various types of quick release fastening means, which may include interlocking edges, friction-fit edges, screws, and magnets. The modular nature of the wall modules 200a-f allows them to be placed in this closed loop, slightly angular pattern, or used separately as individual components for similar rebounding and dribbling exercises.

The wall modules 200a-f are lightweight, which allows them to be positioned anywhere on the playing field 102. Dimensions for each wall module may include 150 cm×50 cm/59"×19.7", with a thickness of 2.5 cm/0.98", and a weight of 28 kg/61.7 lb. The material for the surface of the wall modules 200a-f is a thick, smooth, rough composition that allows the ball 116 to bounce back after engagement with the wall module 200a. In this manner, the player 114 can kick the ball 116 against one or more wall modules 200a-f and the ball 116 quickly returns, or rebounds back to the player 114. Suitable materials for the wall modules 200a-f may include, without limitation, rubber, polymers, metal, and wood. Because the wall modules 200a-f are arranged in the closed loop, slightly angular pattern, the player 114 is free to kick the ball 116 in any direction, up to 360°. This allows the player 114 to practice passing and receiving skills alone, without requiring a playing partner. Further, the coach is free to give feedback to the players, instead of having to focus on serving or feeding balls into play. In alternative embodiments, a sticker or logo can overlay the surface of the wall modules 200a-f, so as to advertise or raise revenue.

Figure 4:
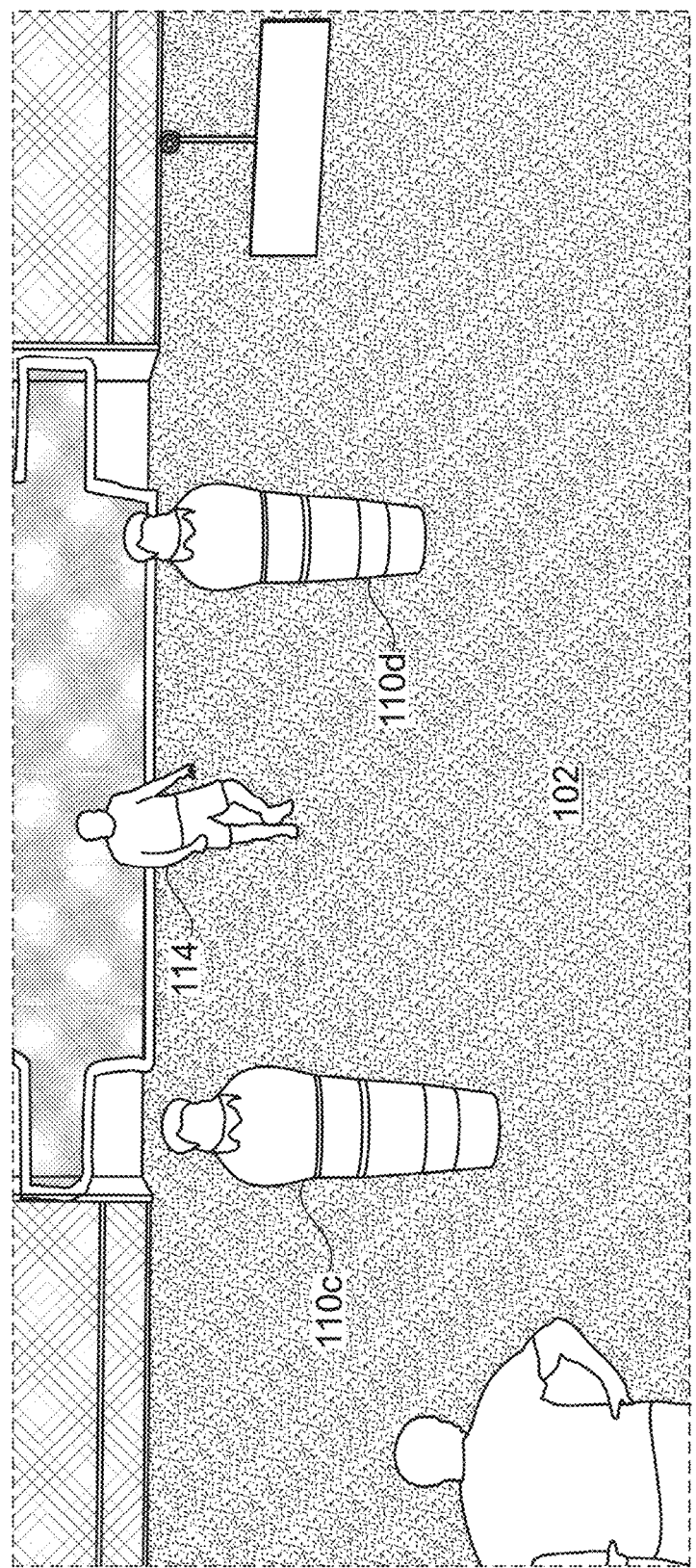
FIG. 4 is a perspective view of a plurality of vertical barriers arranged in a strategic soccer position, in accordance with the present invention.

Looking now at FIG. 4, the system 100 also utilizes a plurality of mobile vertical barriers 110a-d that can be arranged in at least one strategic soccer position on the playing field 102. The mobile vertical barriers 110a-d may include a vertical, elongated human shaped balloon 110e, 110d, a resilient pole 110a, 110b, or any mobile, vertical member used in the art of sports and exercise training. The vertical barriers 110a-d are mobile and lightweight; and thus, can be placed anywhere on the playing field 102 to serve as targets or barriers for the player 114 while dribbling and kicking the ball 116. This allows a single person, such as a coach, or the player 114, to reconfigure the vertical barriers 110a-d during the soccer training.

As shown in FIG. 1, the mobile vertical barriers 110a-d can be positioned across the playing field 102 into at least one strategic soccer position on the playing field 102. The strategic soccer position may include a defensive soccer position through which the player 114 matriculates the ball through, with the objective to shoot the ball 116 towards a restricted goal assembly 700. For example, the vertical barriers 110a-d positioned in a defensive soccer position allows the vertical barriers 110a-d to simulate a real defensive soccer team. In one training technique involving the vertical barriers 110a-d in the defensive soccer position, the player 114 matriculates the ball 116 around and through the vertical barriers 110a-d to reach the restricted goal assembly 700, before kicking the ball 116 towards the restricted goal assembly 700.

Figure 5:
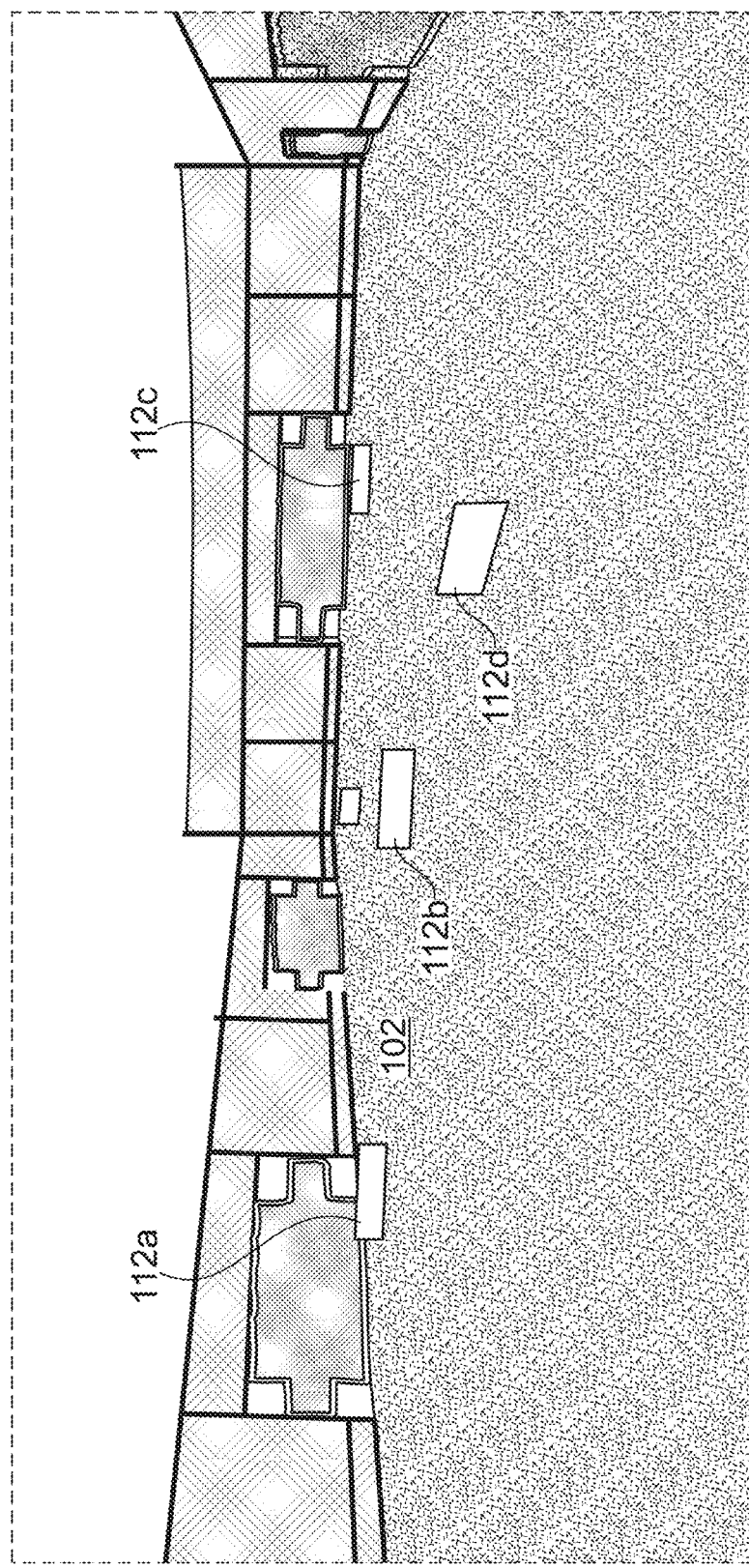
FIG. 5 is a perspective view of a plurality of mobile horizontal barriers arranged in a strategic soccer position, in accordance with the present invention.

Turning now to FIG. 5, the modular training equipment used by the system 100 may further include a plurality of mobile horizontal barriers 112a-e. The horizontal barriers 112a-e may include a generally flat, rectangular shape. In one embodiment, the horizontal barriers 112a-e are lightweight, which allows them to be positioned anywhere on the playing field 102. The material composition of the wall modules 200a-f is a thick, smooth, rough surface composition that allows the ball 116 to bounce back after engagement. In one embodiment, the mobile horizontal barriers 112a-e have a dimension of about 150 cm×50 cm and a thickness of about 2.5 cm.

As illustrated in FIG. 1, the horizontal barriers 112a-e can be arranged in the strategic soccer position across the playing field 102. Similar to the vertical barriers 110a-d, the horizontal barriers 112a-e can be placed anywhere on the playing field 102 to serve as targets or barriers for the player 114 while dribbling and kicking the ball 116. However, due to the wide surface area of the horizontal barriers 112a-e, relative to the vertical barriers 110a-d, the horizontal barriers 112a-e can also serve as targets to kick the ball 116 against, or surfaces to kick and rebound the ball 116; similar to the wall modules 200a-f of the ball rebounding corral 104, described above.

In another possible arrangement of both vertical and horizontal barriers 112a-e, the barriers can be positioned across the playing field 102 to form a technical skill obstacle course for high intensity aerobic training or speed and agility training with the ball 116. The player 114 matriculates the ball 116 through the various types of barriers, competing for the lowest time completed through the course, and finishing by kicking the ball 116 through a restricted goal assembly 700, as described below. In yet another embodiment, the arrangement to form the defensive soccer position may include multiple horizontal barriers 112a-e, vertical barriers 110a-d, or both placed across the playing field 102 in a spaced-apart relationship.

The arrangement of vertical and horizontal barriers 112a-e can be changed regularly by one person, such as a coach. The mobility of the vertical and horizontal barriers 112a-e allows for myriad combinations and creative training on the playing field 102. Furthermore, the horizontal barriers 112a-e can be positioned, so that smallsided games with one or more goals can be played on a portion of the playing field 102.

In some embodiments, the mobile horizontal barriers 112a-e comprise at least one mobility mechanism configured to enable facilitated, one-person mobility of the horizontal barrier. The mobility mechanism may include, without limitation, a wheel, a sled, a series of rollers. The mobility mechanism may also include a "wheel barrel" type wheel configuration that allows the horizontal barrier to be moved like a wheel barrel. The mobility mechanism and lightweight configuration of the horizontal barrier enables facilitated displacement of barriers across the playing field 102 into at least one strategic soccer position. For example, the strategic soccer position may include a defensive soccer position through which the player 114 matriculates the ball 116 through, with the objective to shoot the ball 116 towards a restricted goal assembly 700.

Figure 6:
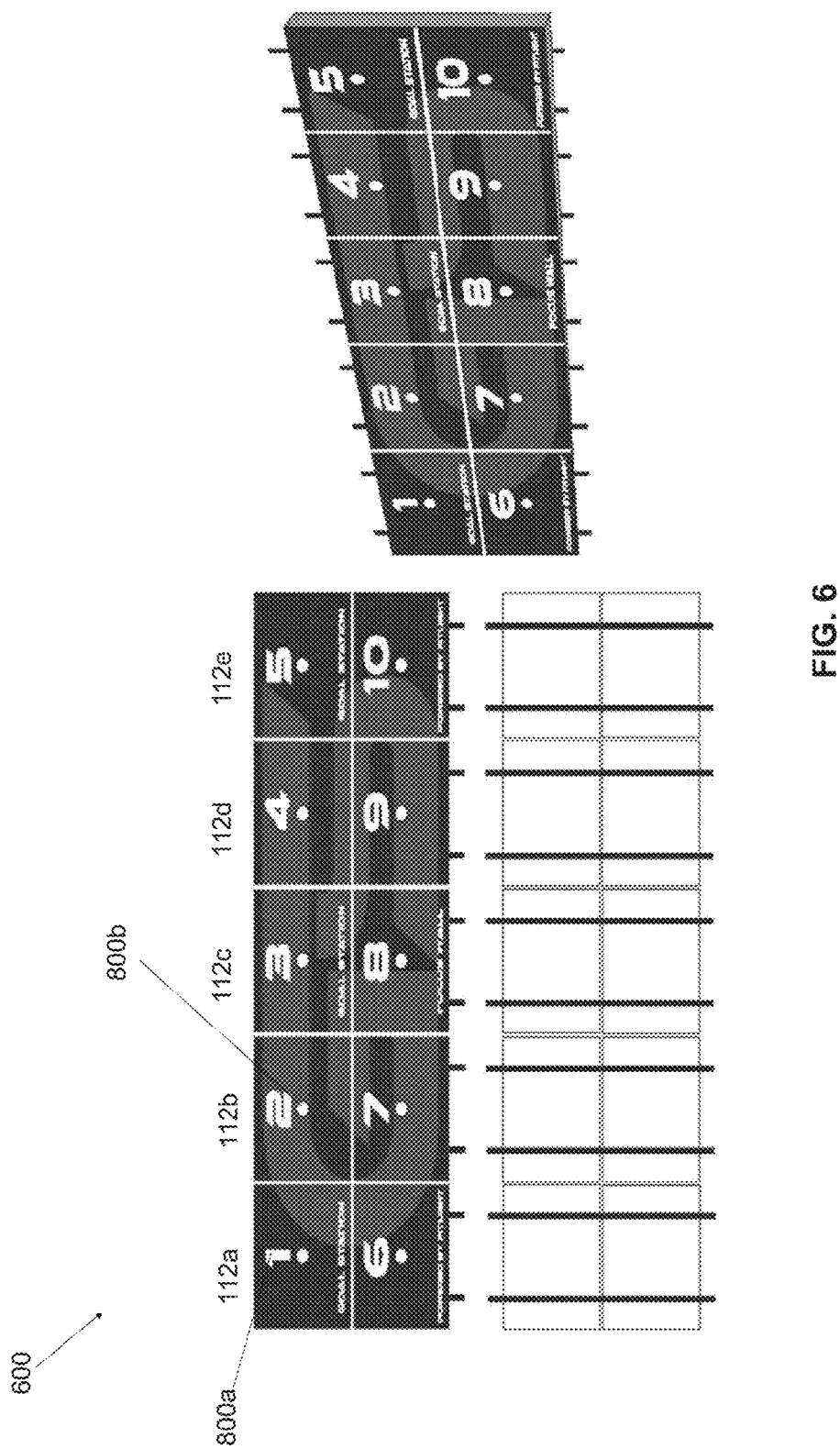
FIG. 6 is a perspective view of mobile horizontal barriers stacked as targets forming a Focuswall, in accordance with the present invention.

In another example shown in FIG. 6, multiple horizontal barriers 112*a-e* are joined together and marked with points to create a target game called "Focus Wall" 600. The player 114 develops shooting skills by kicking the ball 116 at the marked-up horizontal barriers 112*a-e*. Myriad combinations of exercises and training games can be configured with the horizontal barriers 1 12*a-e*. For example, if the player 114 kicks the ball at, and hits the barrier marked with the number 1, illuminating targets 800*a-d* inside the barriers light up. But if the player strikes the barrier marked with number 2, the illuminating targets 800*a-d* will not be activated by the ball impact. In one non-limiting embodiment, the barriers are aluminum plates with foam padding inside, and painted numbers. A central hole receives the illuminating targets 800*a-d*, while a sensor detects pressure from a ball striking the plate to trigger the illuminating targets 800*a-d*.

Figure 7:
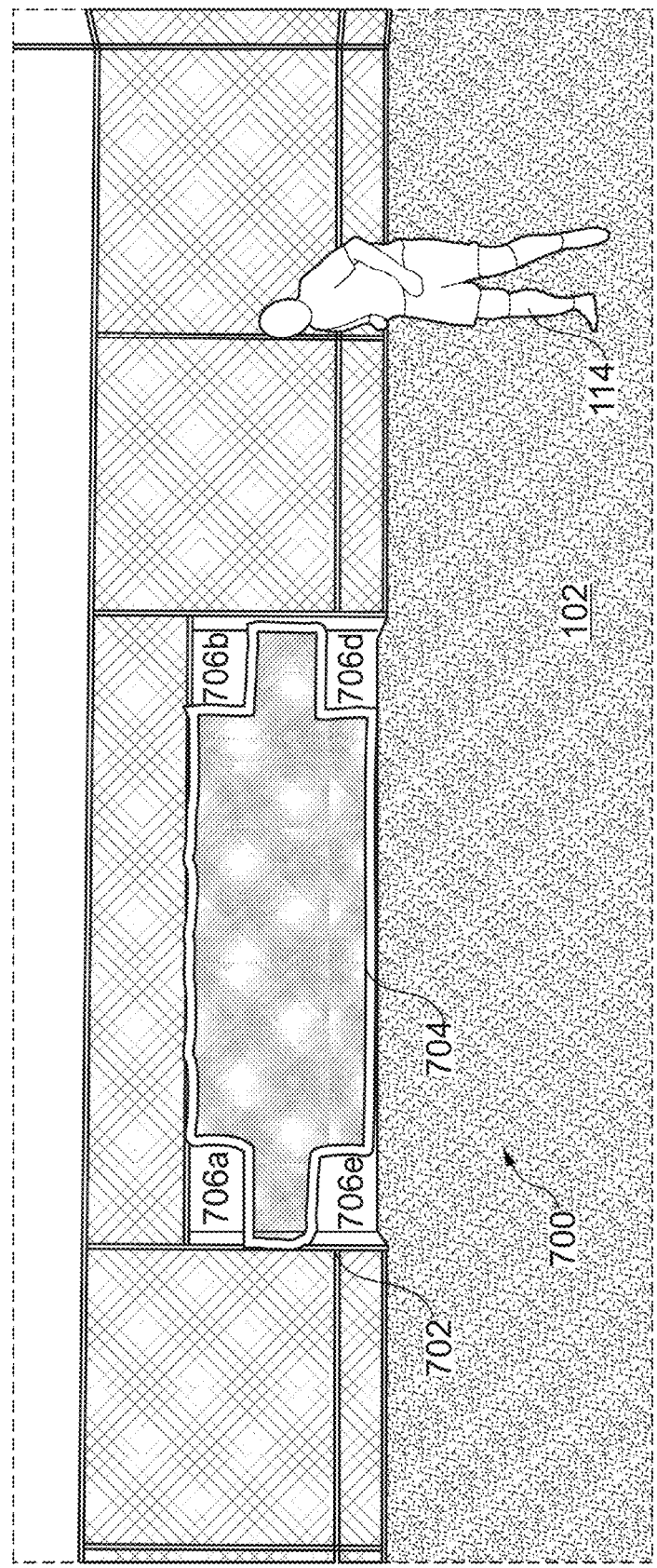
FIG. 7 is a perspective view of a restricted goal assembly, in accordance with the present invention.

As referenced in FIG. 7, the system 100 utilizes a restricted goal assembly 700 on the playing field 102 to provide a target for the player 114 to kick the ball 116 into, and thereby score a goal. The restricted goal assembly 700 may include a frame 702, a net, and a generally cross-shaped panel 704 extending across the frame 702. In some embodiments, the frame 702 may include two upright posts joined at the top by a horizontal crossbar. The inner edges of the upright posts may be dimensioned at about 7.32 meters (8 yards) apart, and the lower edge of the crossbar are about 2.44 meters (8 feet) above the ground. The net is stretched behind the frame 702. A goal is scored when the ball 116 crosses a goal line extending between the upright posts and strikes the net behind the posts.

In some embodiments, the orientation of the cross-shaped panel 704 across the frame 702 forms multiple corner target zones 706*a-d*. As illustrated in FIG. 7, the corner target zones 706*a-d* may be 100c×70 cm openings in the corners of the cross-shaped panel 704 that allow the ball 116 to pass through to the net. The corner target zones 706*a-d* are generally out of reach of the goalie, so that training to kick the ball 116 towards the corner target zones 706*a-d* enhances the probability of scoring a goal for the player 114. This restricted configuration of the goal assembly 700 forces the player 114 to kick the ball 116 in tight spaces. Thus, through repetition, the player 114 can build automatic muscle memory while shooting a goal, and finishing in the upper and lower 90's of the goal.

Figure 9:
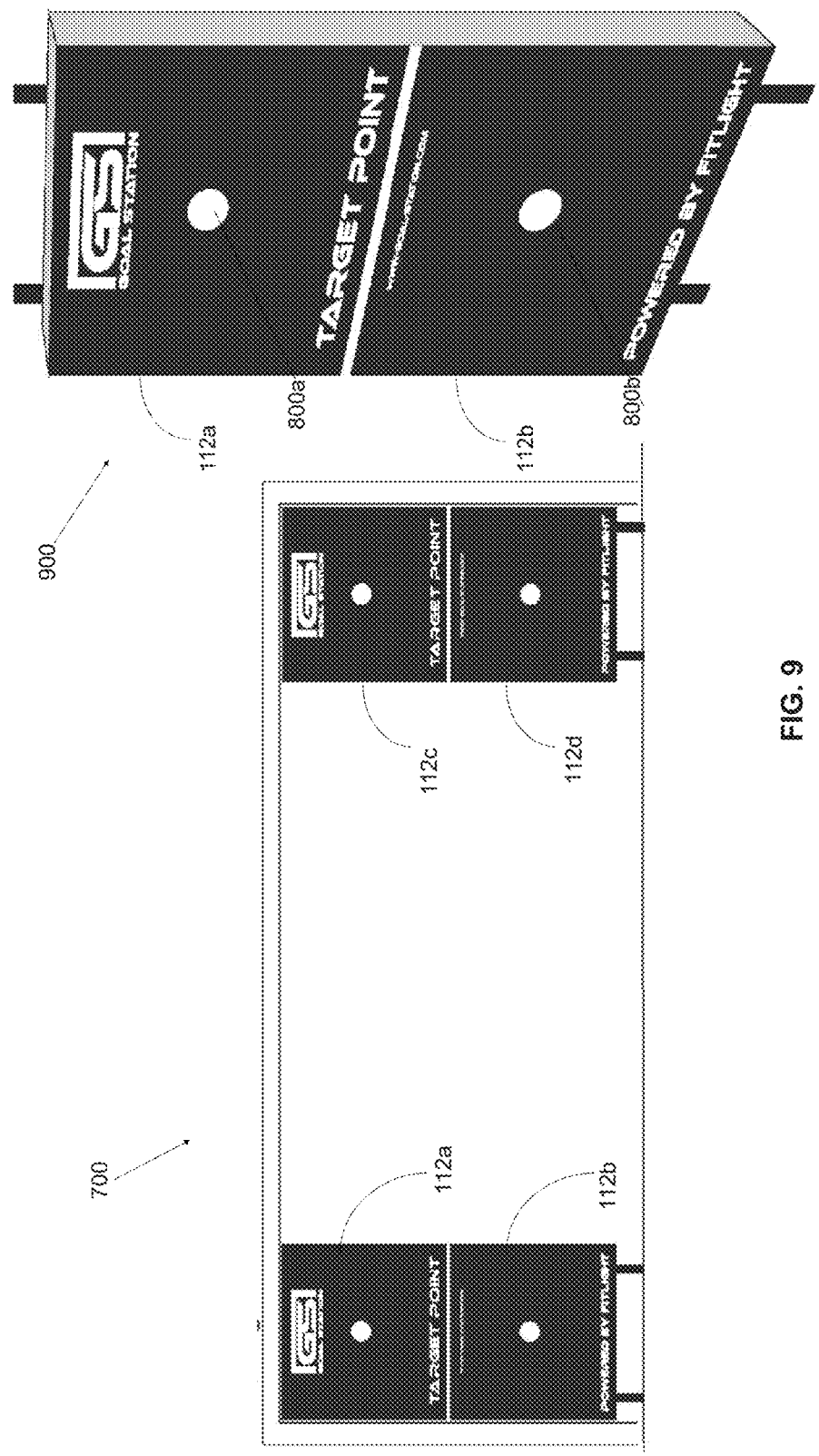
FIG. 9 is a perspective view of a horizontal barriers used in conjunction with the restricted goal assembly, in accordance with the present invention.

In another embodiment, the restricted goal assembly 700 may be combined with other modular training equipment. This creates a synergetic effect that enhances soccer training and allows for creative training practices. For example, FIG. 9 shows two horizontal barriers 112*a-e* stacked on each end of the restricted goal assembly 700 to form a target game called "Target Point" 900. In this unique arrangement, the player 114 kicks the ball at, and hits the barrier marked with the number 1 to illuminating target 800*a* inside the barriers. If the player strikes the barrier marked with number 2, the illuminating targets 800*a-d* will not be activated by the ball impact. In one non-limiting embodiment, the barriers are aluminum plates with foam padding inside, and painted numbers. A central hole receives the illuminating targets 800*a-d*, while a sensor detects pressure from a ball striking the plate to trigger the illuminating targets 800*a-d*.

The "Target Point" 900, in addition to the cross-shaped panel 704, and restricted goal assembly 700 create a synergy that increases the level of difficulty in scoring a goal through the corner target zones 706*a-d*. This forces the player 114 to adapt to a real soccer situation, such as a corner kick, in which opposing players line up at the outer posts of the goal assembly 700. As discussed above, the combination of modular training equipment and illuminating targets 800*a-d* allow for creative soccer training.

Figure 8:
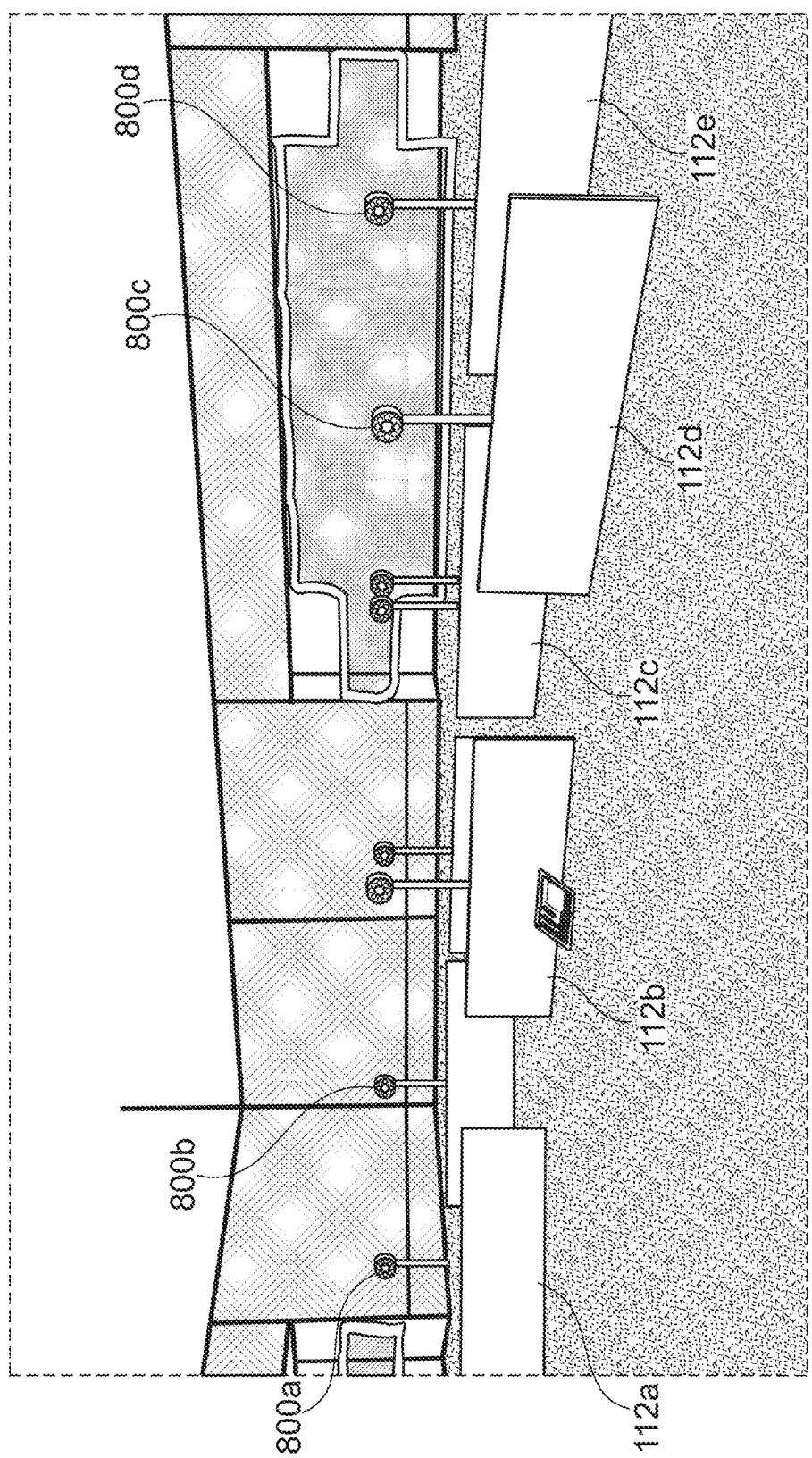
FIG. 8 is a perspective view of multiple horizontal barriers with attached illuminating targets, in accordance with the present invention.

As FIG. 8 references, the modular training equipment also includes a plurality of illuminating targets 800*a-d*. The illuminating targets 800*a-d* are configured to automatically illuminate in a synchronized lighting pattern that can be preprogrammed to achieve a customized and result-specific training regimen. The lighting pattern is configured to highlight an athlete approximate area for the ball 116 to strike, or the player 114 to avoid. The illuminating targets 800*a-d* may be detachably attached, or in proximity to, the wall modules 200*a-f* of the ball rebounding corral 104, the mobile vertical and horizontal barriers 110*a-d*, 112*a-e*, and the restricted goal assembly 700.

In one non-limiting embodiment, the illuminating targets 800*a-d* comprise a pole 1000*a* and an illuminating pad 1000*b*. The pole 1000*a* carries the illuminating pad 1000*b* from a distal end. The illuminating pad 1000*b* lights up in a synchronized lighting pattern or a steady light. The illuminating pad 1000*b* may utilize a power source, LED bulbs, and variously colored and shaped lenses. A proximal end of the pole 111üa attaches to the wall module 200*a*, horizontal barrier 112*a*, or area near the goal assembly 700, from a proximal end.

Figure 3:
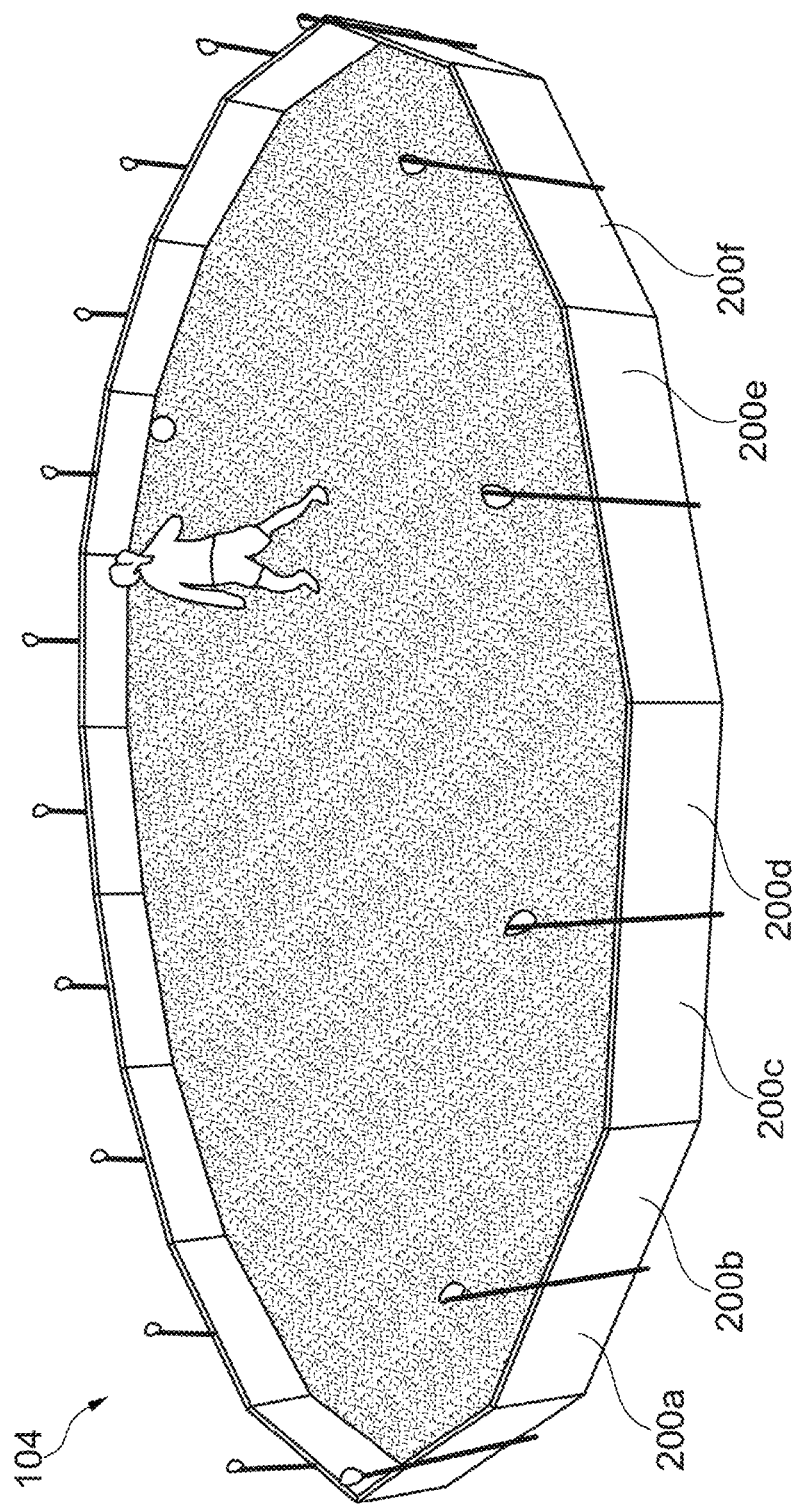
FIG. 3 is a perspective view of a ball rebounding corral containing a player rebounding a ball, in accordance e with the present invention.
Figure 10:
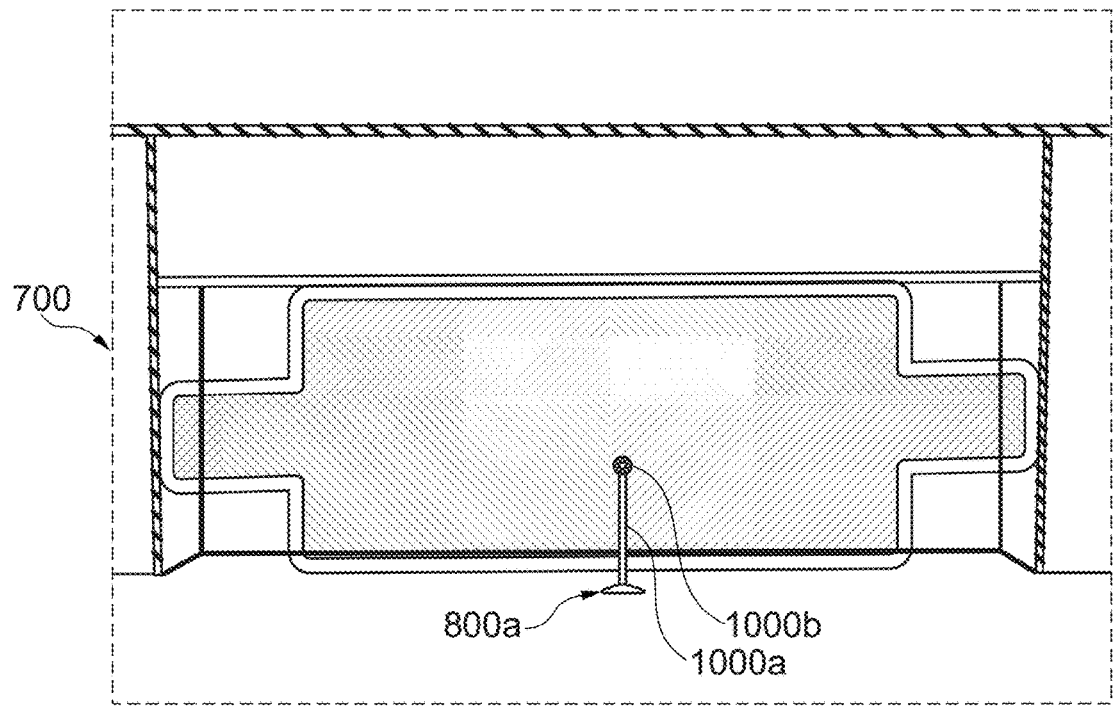
FIG. 10 is a perspective view of an illuminating target in front of the restricted goal assembly, in accordance with the present invention.

This combinative arrangement between the illuminating targets 800*a-d* and the modular training equipment creates a synergy that enhances the soccer training. For example, FIG. 3 illustrates an illuminated target attached to a closed loop, slightly angular arrangement of attached wall modules 200*a-f* forming the ball rebounding corral 104. FIG. 8 illustrates illuminated target 800*a-d* attached to each of a series of horizontal barriers 112*a-e* arranged in a strategic soccer position. FIG. 10 illustrates an illuminated target 800*a* attached to the playing surface in front of the restricted goal assembly 700. This can help the player 114 to aim more accurately towards the goal assembly 700.

Each combination of illuminating targets 800*a-d* and modular training equipment is designed to achieve a specific training objective. This is demonstrated in FIG. 3, where multiple wall modules 200*a-f* are attached to form a closed loop, slightly angular-shaped ball rebounding corral 104. Illuminating targets 800*a-d* operatively attach to the wall modules 200*a-f*. The illuminating targets 800*a-d* illuminate in a synchronized lighting pattern. The player 114 kicks the ball 116 towards a wall module 200*a* attached to the illuminating target 800*a* that lights up. This forces the player 114 to quickly decipher which wall module 200*a* has the light and kick the ball 116 in that direction. As discussed above, the resilient surface of the wall modules 200*a-f* allows the ball 116 to return to the player 114 so that the next lighted illuminating target can be recognized.

Various other combinations of modular training equipment and illuminating targets 800*a-d* may also be used. For example, a combination of eight wall modules 200*a-f* and four illuminating targets 800*a-d* is effective training for sharpening the first touch with the ball 116, improving pass precision, accelerating reaction time, and training all surfaces of the foot. The combination of twelve wall modules and six illuminating targets is effective training for enhancing vision and awareness, developing quick orientation, and executing accurate passes. The combination of sixteen wall modules and eight illuminating targets is effective training for dominating 1 vs. 1 duels, adapting quickly to new stimuli, and cultivating creative playing techniques.

Figure 11:
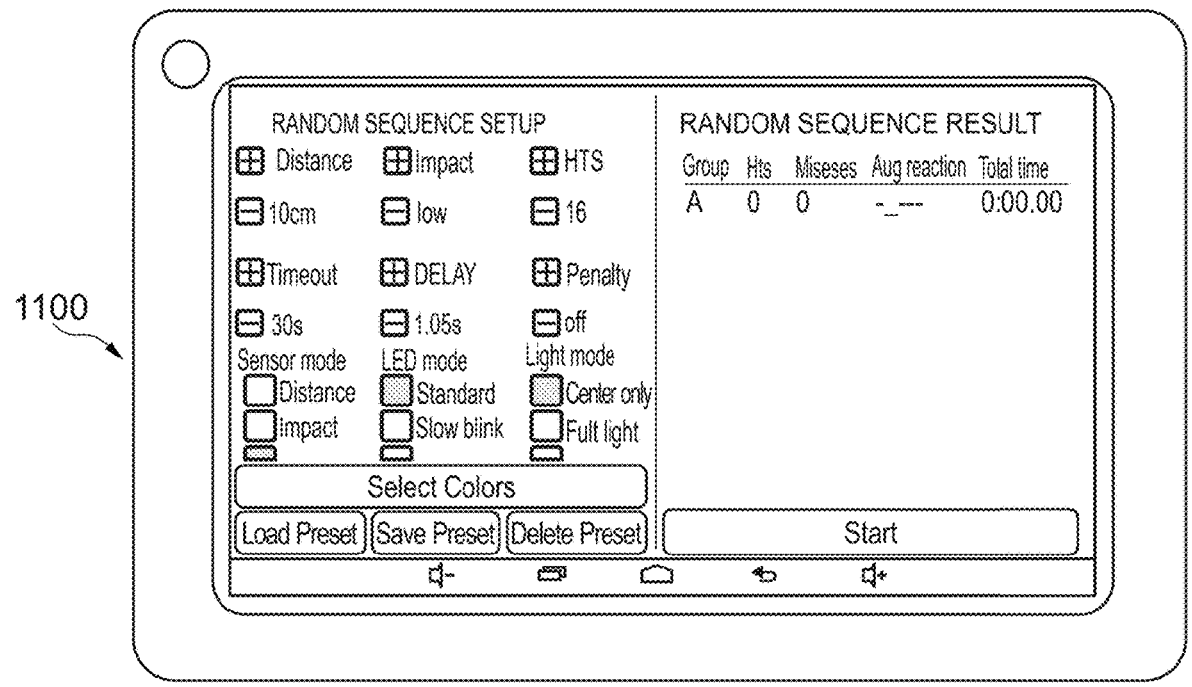
FIG. 11 is a perspective view of an exemplary control system displaying a menu to control the illuminating targets, in accordance with the present invention.

Looking now at FIG. 11, a system controller 1100 is used to control the synchronized lighting pattern by the illuminating targets 800a-d. The system controller 1100 may communicate with each illuminating target to signal a command to light up. This creates the synchronized lighting pattern. However, the lighting pattern can also be preprogrammed to achieve a customized and result-specific training regimen. The system controller 1100 also includes a digital display that displays and allows control of the intensity and sequence of illuminating targets 800a-d. Each illuminating target 800a-d can be programmed to have a different light intensity and a different duration of lighting. The illuminating targets 800a-d can also be programmed to illuminate randomly with a timing algorithm or internal clock, known in the art.

Figure 12:
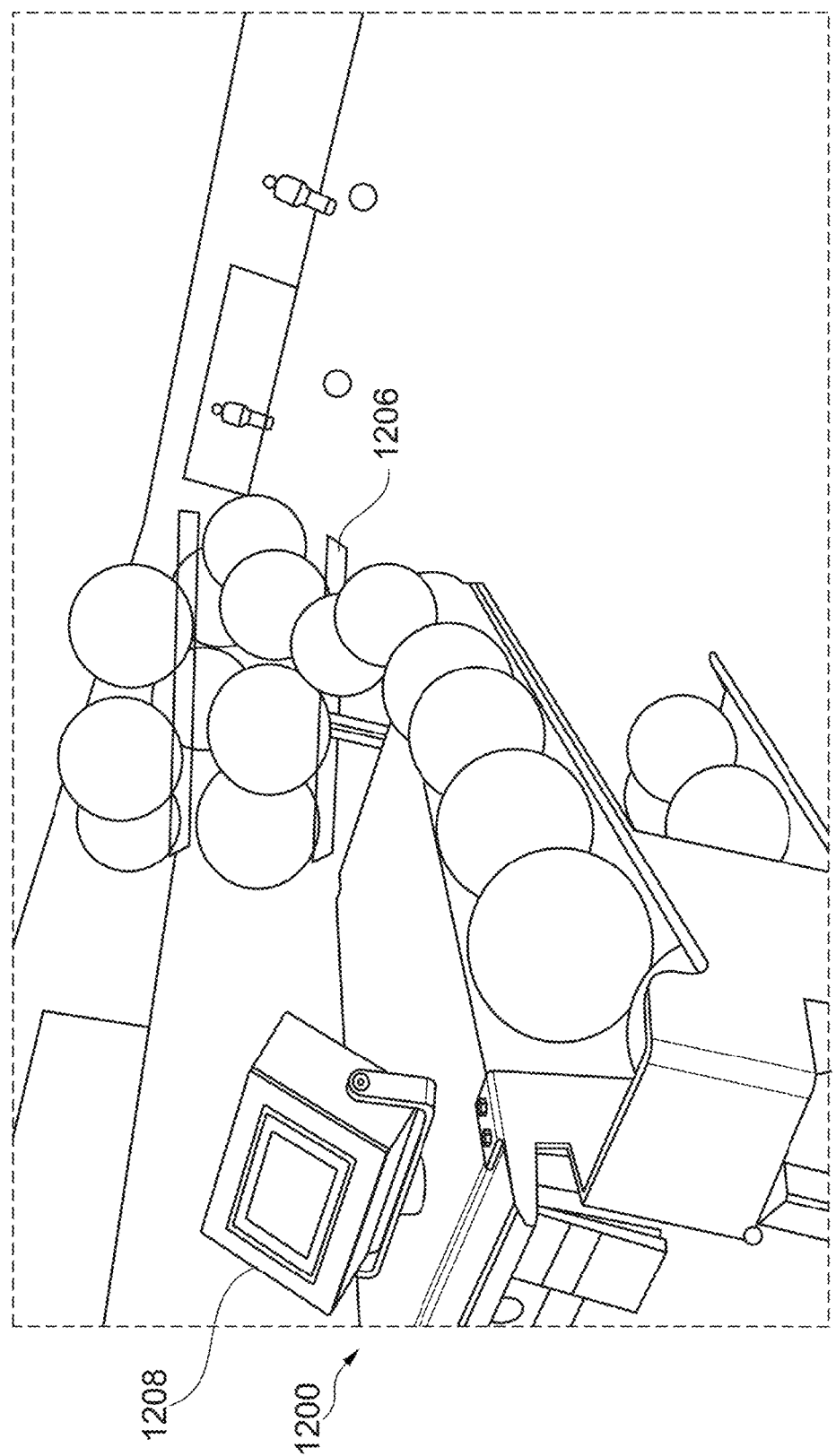
FIG. 12 is a perspective view of an exemplary ball serving assembly, in accordance with the present invention.

Looking now at FIG. 12 a ball serving assembly 1200 is used to serve the ball 116 to the player 114 by receiving, retaining, and forcibly discharging the balls 116 in a controlled manner. The ball serving assembly 1200 is unique in the precision service of the balls 116, in that the discharge of the ball 116 can replicate any type of pass or shot from a player 114, with or without spin. For example, the ball serving assembly 1200 can serve a crossing pass to a player 114, so that the player 114 can attempt to kick the ball 116 towards the restricted goal assembly 700 to develop shooting skills. The ball serving assembly 1200 can shoot goals at a goal keeper who is guarding the restricted goal assembly 700 to help that player 114 develop goal keeping skills. The ball serving assembly 1200 can serve passes on the ground or the air to help the player 114 develop pass receiving skills.

Figure 13:
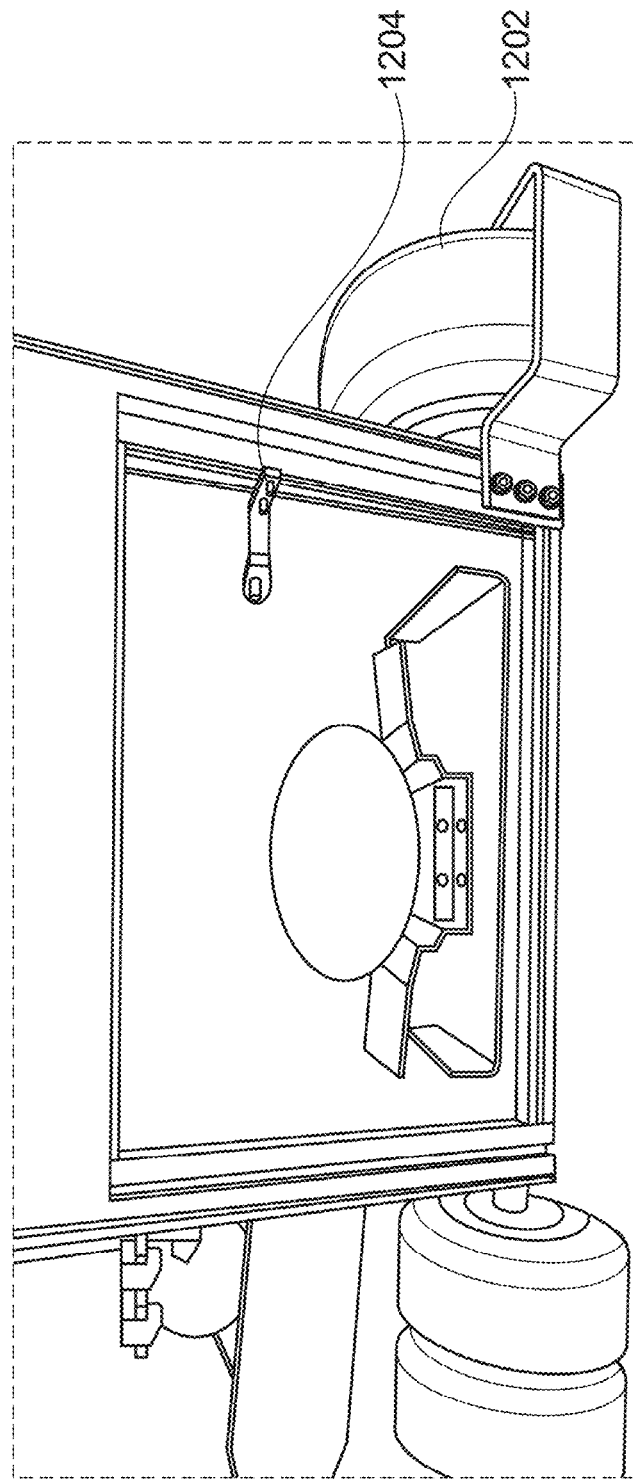
FIG. 13 is a perspective view of a cavity retaining balls in the ball serving assembly, in accordance with the present invention.

As FIG. 13 illustrates, the ball serving assembly 1200 comprises an inlet chute configured to receive the ball 116; a cavity 1204 configured to retain the ball 116; a ball discharge outlet 1206 configured to discharge the ball 116; and a ball controller 1208 configured to control service of the ball 116 at specific shot sequences and trajectories. The ball controller 1208 provides multiple combinations of speed and trajectory that enable sequential delivery of the balls 116 through the ball discharge outlet 1206. In some embodiments, the ball controller 1208 is a color touch display that displays the serving options on a digital menu.

Further, the ball serving assembly 1200 may utilize a battery that has sufficient power to enable up to one thousand serves before requiring recharging or replacement. The ball serving assembly 1200 may also utilize six puncture proof tires 1202 that enable facilitated mobility and repositioning on the playing field 102. The ball serving assembly 1200 may also be remote controlled; and thereby have a remote-control receiver (not shown). Further, the mechanism that actuates the balls through the outlet 1206 may include a motor and a pair of spaced-apart spinning wheels.

In some embodiments, the system 100 utilizes at least one sensor to detect the motion and position of the ball 116 and the player 114. The sensor may use both hardware and software to monitor, through the sensor, one or more data/attributes/characteristics, e.g., leg speed, ball speed, etc., of the player 114 and ball 116 while performing various training exercises. In one non-limiting embodiment, the sensor is a motion sensor that detects the leg speed of the player, velocity of the ball, trajectory of the ball, and position of the player and the ball on the playing field 102.

The sensor derives data from the detected motion and position of the ball 116 and the player 114 relative to each other and relative to the ball rebounding corral 104, the vertical barriers 110a-d, the mobile horizontal barriers 112a-e, the restricted goal assembly 700, the illuminating targets 800a-d, and the ball serving assembly 1200. This data is collected in real time and can be monitored by the coach or player during training.

In some embodiments, a remote data storage device (not shown) may be used to receive, store, and transmit the data from the sensor. The remote data storage device may include, without limitation, a server, a cloud, or a database. In one non-limiting embodiment, the data/attributes/characteristics for the player 114 is stored in a remote data storage device, such as an admin server. The data can be used to determine the strategic soccer position of the barriers and illuminating targets 800a-d on the playing field 102. For example, the data at least partially determines the synchronized lighting pattern of the illuminating targets 800a-d, based on the light recognition and kicking dexterity of the player 114. Or the data helps in spacing the horizontal barriers 112a-e, based on the speed of the player 114.

Further, the sensor may operatively connect to the ball serving assembly 1200, so as to better control when to serve the ball 116 to the player 114 for taking a shot or blocking a shot. As data is produced, the ball serving assembly 1200 is commanded to serve the ball 116 accordingly. For example, when the player 114 is near the restricted goal assembly 700, the ball serving assembly 1200 passes the ball 116 at a low speed cross serve to the player 114. In this manner, the data at least partially determines the shot sequence and trajectory of the ball 116 from the ball serving assembly 1200. In yet other embodiments, the data may be recalled and/or transmitted to other users. The data can then be analyzed to design a specific soccer training regimen for the player 114.

Figure 14:
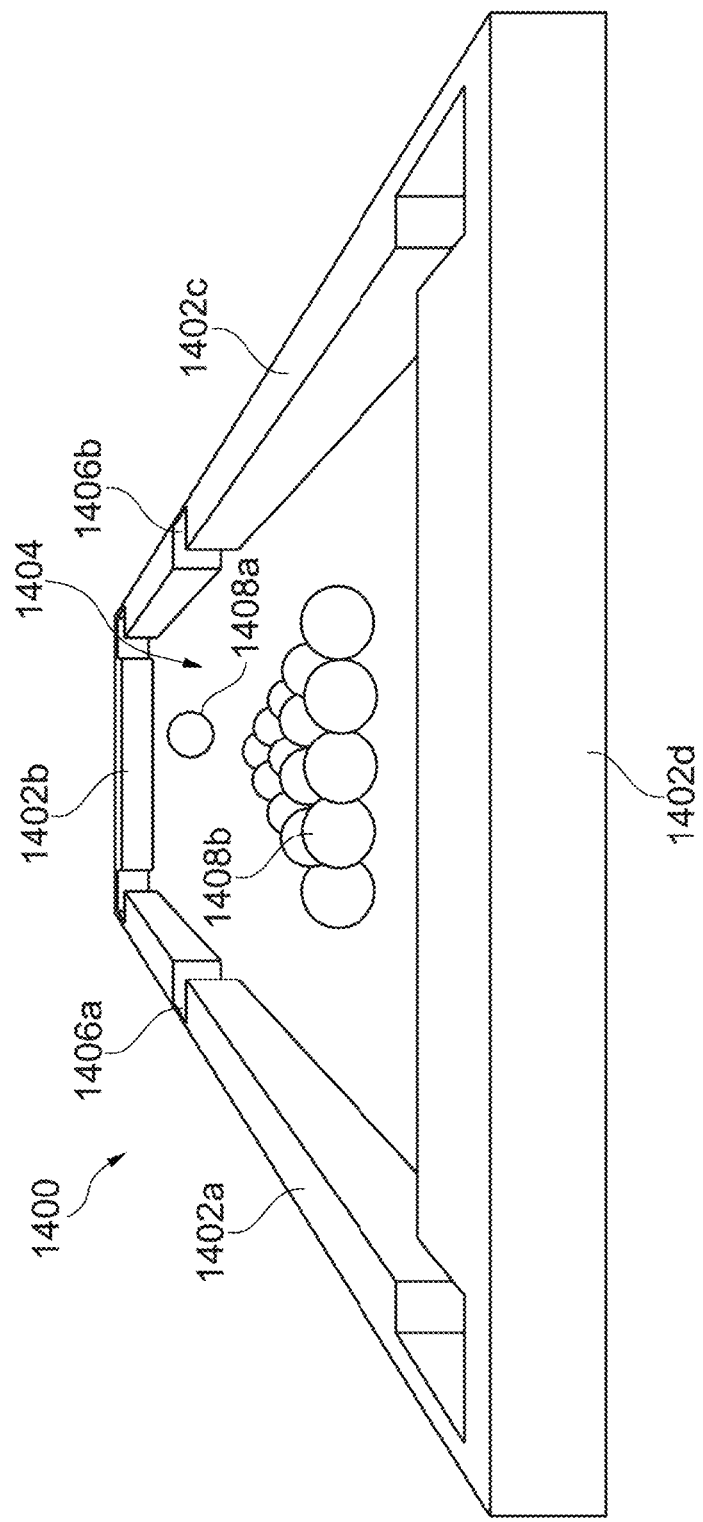
FIG. 14 is a perspective view of an exemplary pool game pen, m accordance with the present invention.

Turning now to FIG. 14, the system 100 may also include a pool game pen 1400 that allows the player 114 to play a hybridized soccer version of pool, or billiards. The pool game pen 1400 may be used independently of the other modular training equipment, or in conjunction with the other modular training equipment on the playing field 102.

In some embodiments, the pool game pen 1400 may be defined by four sidewalls 1402a-d forming a pool playing zone 1404. The sidewalls 1402a-d form a generally rectangular shape and are up to 1' high. The sidewalls 1402a-d defined by multiple spaced-apart pockets 1406a-b.

In some embodiments, the dimensions of the sidewalls 1402a-d may be about 600 cm×300 cm/236"×118". The weight of the sidewalls 1402a-d is about 162 kg. The material composition of the sidewalls 1402a-d may include aluminum, AlMg3, a lightweight metal, a polymer, and wood.

Figure 15:
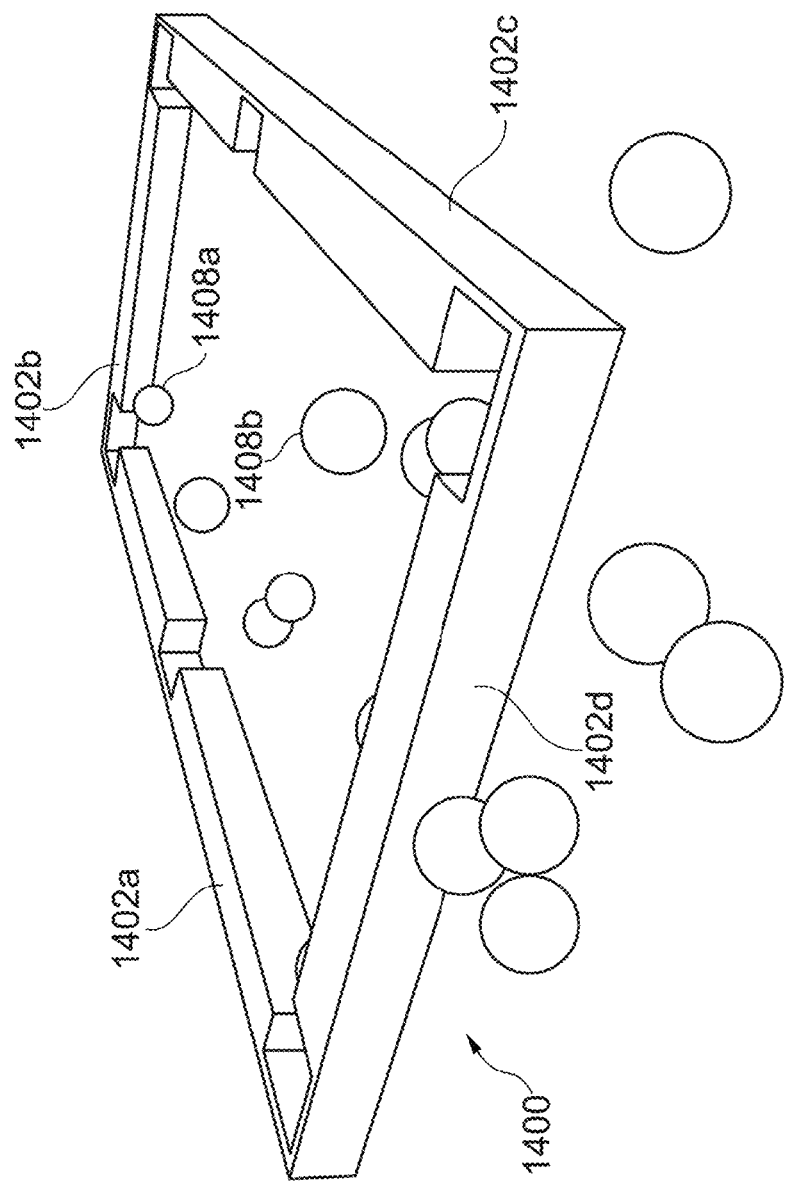
FIG. 15 is a perspective view of players in a pool playing zone kicking the pool balls, in accordance with the present invention.

Turning now to FIG. 15, the pool game pen 1400 utilizes a plurality of pool balls 1408a-b designed to replicate standard pool balls 1408a-b used in a pool, or billiard game. The pool balls 1408a-b are contained in the pool playing zone 1404. The pool balls 1408a-b are sized and dimensioned to engage the sidewalls 1402a-d, and enter the pockets 1406a-b that form in the sidewalls 1402a-d. In one non-limiting embodiment, the sixteen pool balls 1408a-b having a size "4" and a numbered logo printed thereon are used. Though other shapes and dimensions of the pool balls 1408a-b may also be used.

The rules of the soccer pool game are generally adapted similarly to pool/billiard game played on a standard pool table. The game is played with 2 teams competing, from 1 to 10 players per team. The soccer pool game requires two teams of players to kick an eight-pool ball against the other fifteen pool balls, so as to force them into one of the pockets 1406a-b. The soccer pool game is effective for developing deductive logic and precision of passing, as each player 114 attempts to place the pool balls 1408*a-b* in the oversized pockets 1406*a-b*.

Figure 22:
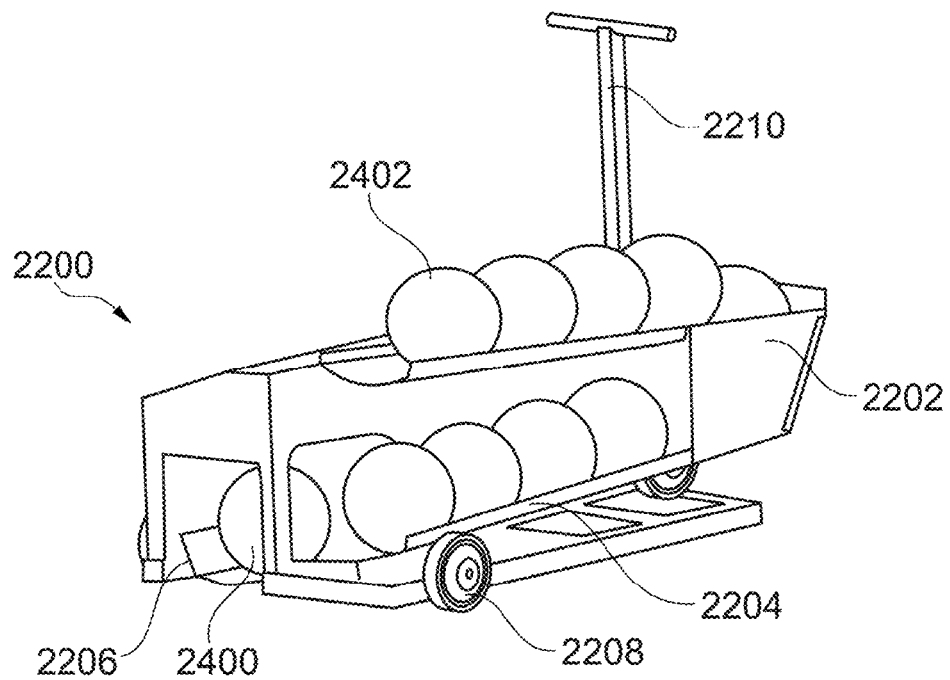
FIG. 22 illustrates a perspective view of an exemplary ball dribbling assembly, in accordance with the present invention.

Looking ahead at FIG. 22 the system 100 may also include an exemplary ball dribbling assembly 2200. The ball dribbling assembly 2200 ejects balls in different sizes 2400, 2402. The ball dribbling assembly is driven by an air compressor, powered by either an electrically connected alternating current (A/C) connection or direct current (D/C) connection, e.g., battery operated. The ball dribbling assembly 2200 shoots balls against the player, and at different speeds. In this manner, the player is forced to dribble around the ejected balls, so as to enhance dribbling skills. The ball dribbling assembly 2200 includes an intake chute 2202 that is inclined to enable the ball to roll along an inclined panel 2204 to an ejection point 2206. The ball dribbling assembly 2200 further comprises a discharge device 2206 that kicks out the ball through use of air compressors and pistons from the ejection point 2206. The speed and frequency of ejection can be controlled.

Figure 23:
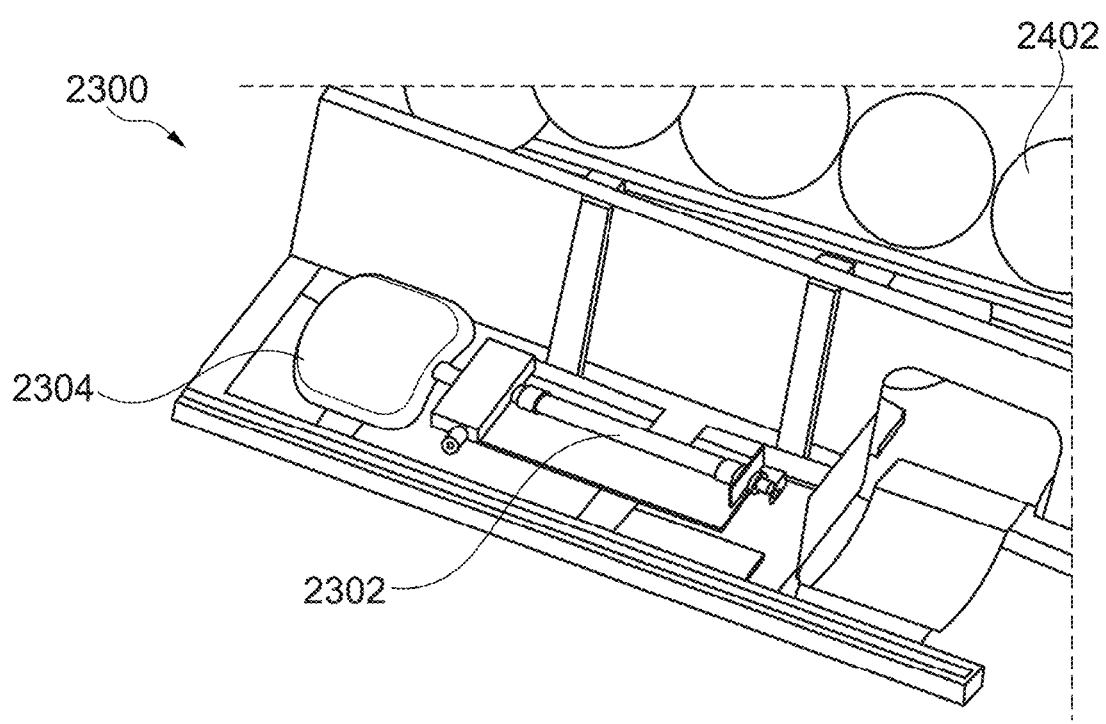
FIG. 23 illustrates a close-up view of an air compressor and ejection rod for a ball kicking assembly, in accordance with the present invention.
Figure 24:
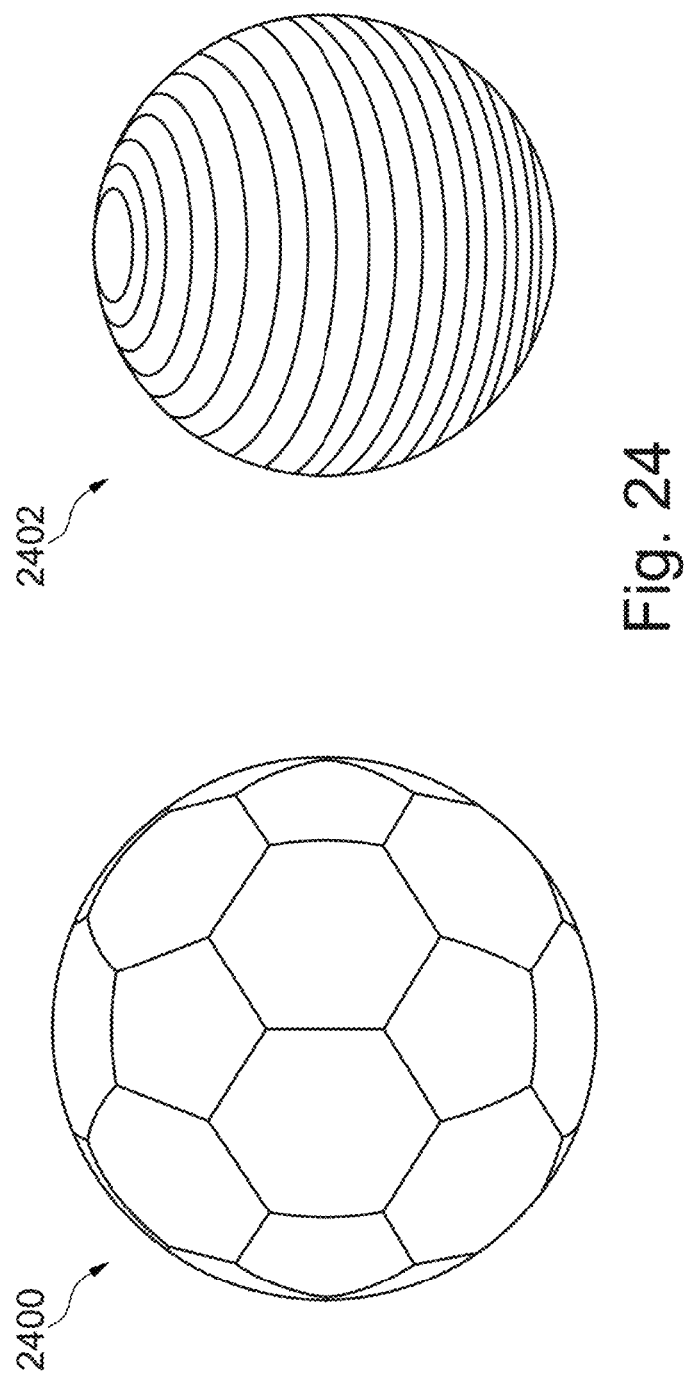
FIG. 24 illustrates an exemplary large ball and small ball used in the ball dribbling and kicking assemblies, in accordance with the present invention.

FIG. 23 illustrates a close-up view of an air compressor 2302 and ejection rod 2304 for ejecting a ball from a ball kicking assembly 2300. Similar to the ball dribbling assembly 2200, the ball kicking assembly 2300 utilizes an air compressor and an ejection rod to eject the balls 2400, 2402, but along the ground. The kicking assembly may also be powered by either an electrically connected alternating current (A/C) connection or direct current (D/C) connection, e.g., battery operated. The kicker is forced to shoot the ball flat on the ground. It is significant to note that no other ball cannon known in the art can do that. FIG. 24 illustrates an exemplary large ball 2400 and small ball 2402 used in the ball dribbling and kicking assemblies 2200, 2300. The variously sized balls can be useful for adapting to different speeds and variations of dribbling and kicking training sequences.

Figure 16:
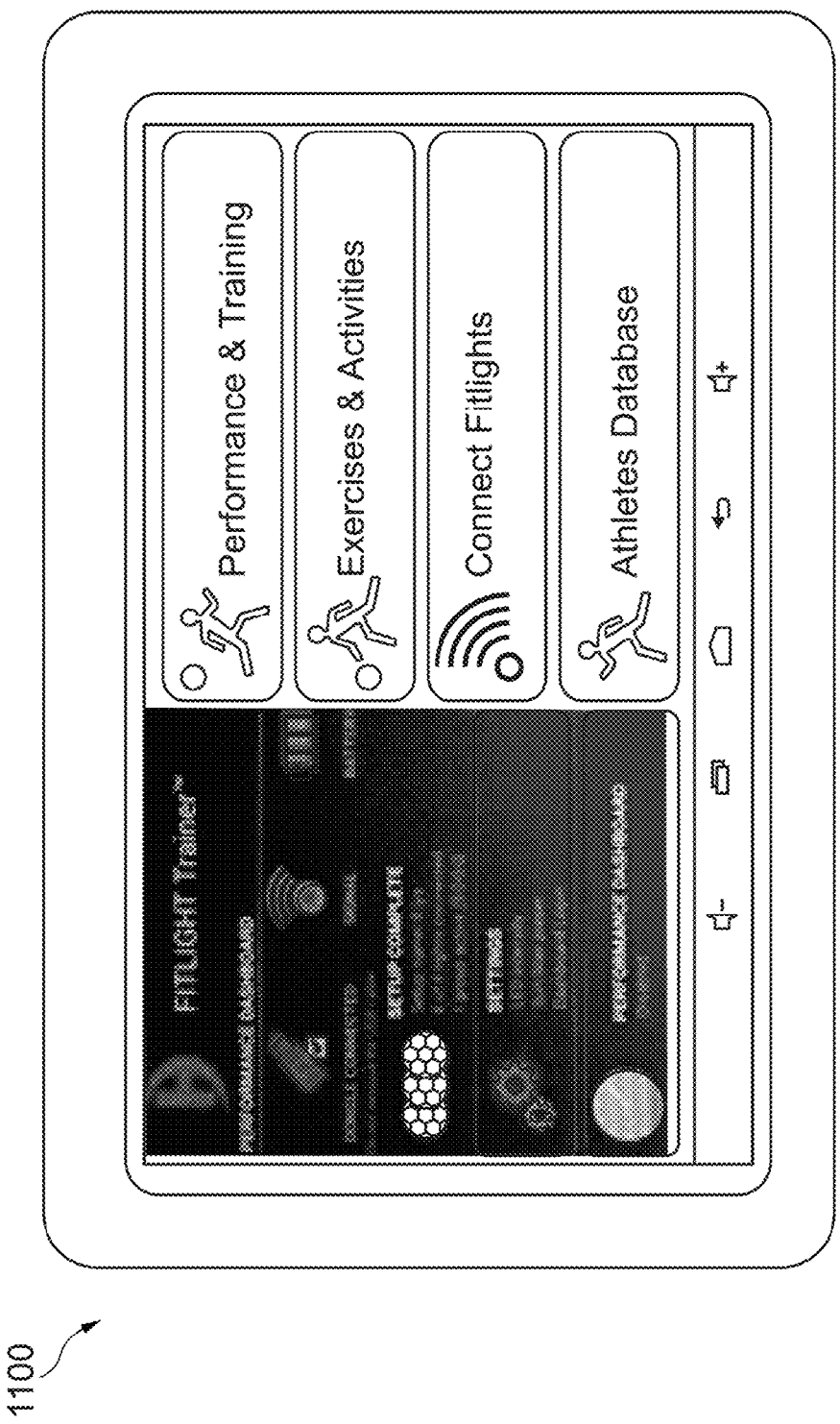
FIG. 16 is a top view of a system controller displaying menu options for control of the modular training equipment and training instructions, in accordance with the present invention.

Turning back to FIG. 16, a system controller 1100 can be used to regulate different variations of the system 100. This controllability allows for customizing operation of the illuminating targets 800*a-d* and ball serving assembly 1200 for various types of exercises and training regimens. In one embodiment, a performance and training module 1602 allows the player 114 or coach to view and control aspects of the modular training equipment. An exercise and activities module 1604 controls the modular training equipment, including the illuminating targets 800*a-d* and the ball serving assembly 1200.

Further, an illuminating target module 1606 directly controls the illuminating targets 800*a-d*, and synchronized lighting pattern thereof. The light pattern and light intensity can also be controlled from the illuminating target module 1606. An athlete's database 1608 provides different exercises helpful to develop soccer skills, such as running and calisthenics. For example, stretching videos and running advice may be displayed on a video.

Figure 17:
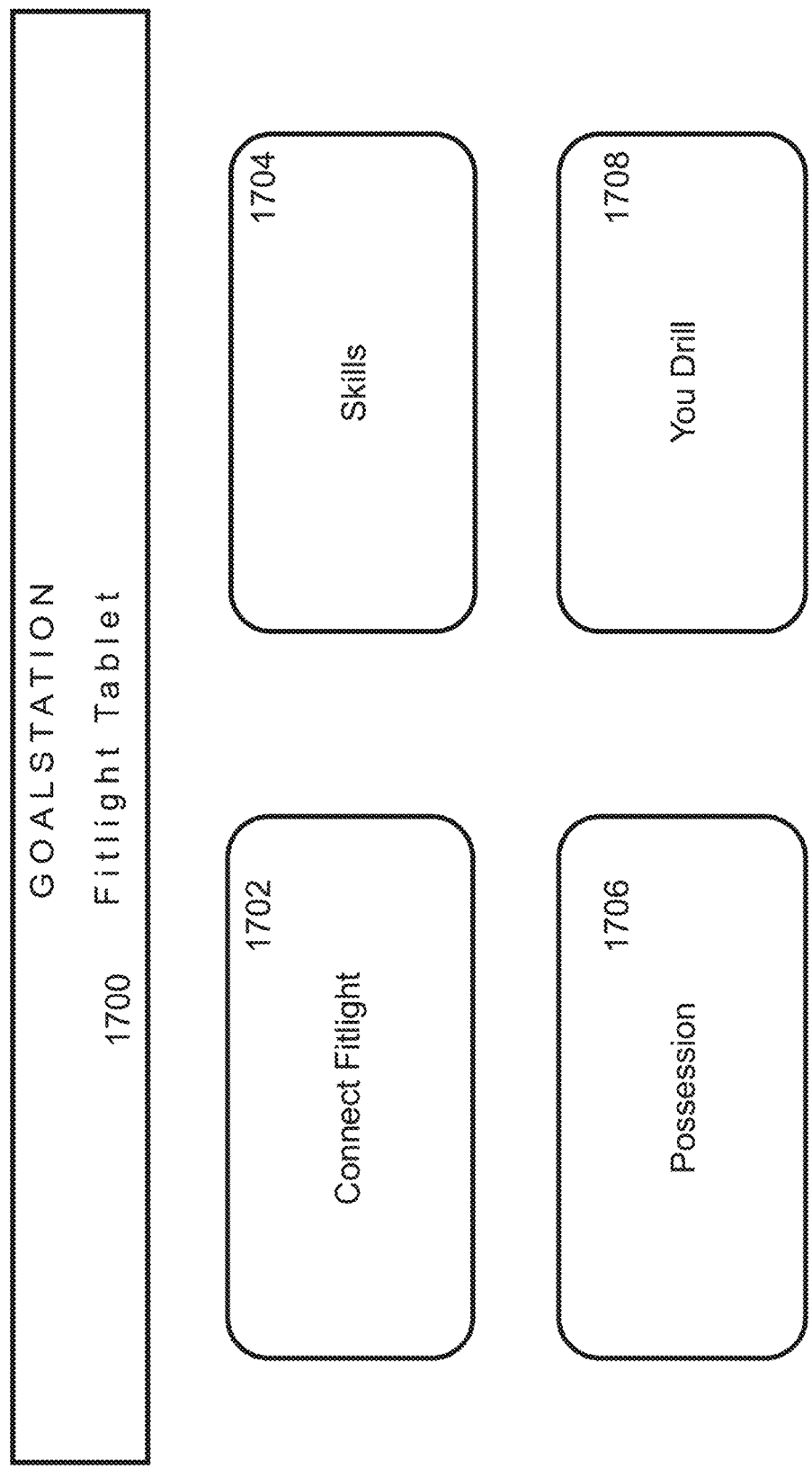
FIG. 17 illustrates a display screen on the control system showing a training option menu that allows the player or coach to select from different training techniques, in accordance with the present invention.

FIG. 17 illustrates a display screen on the control system 100 showing a training option menu 1700. The training option menu 1700 is configured to enable the player 114 or coach to select from different training techniques. The training option menu 1700 includes an illuminating targets option 1702 that provides access to directly control the illuminating targets 800*a-d*, and synchronized lighting pattern thereof. From the illuminating targets option 1702, the light pattern and light intensity of the illuminating targets 800*a-d* can be controlled. Further, a skills option 1704 enables access to provide digital or video instructions from the control system 100, and controlling the modular training equipment, so that the player 114 can concentrate on a specific soccer skill set. The collected data from the sensors may also be used to determine the weaknesses of the player 114 for reinforcement of the training in that particular skill set.

Continuing with the training option menu 1700, a position option 1706 that trains specific positions for soccer, and also enables access to the different arrangement possibilities of the modular training equipment for each position. The player 114 or coach can decide how to arrange, accordingly. For example, the restricted goal assembly 700 can be arranged with horizontal barriers 112*a-e* to train the goal keeper. Another option is a you drill option 1708 that enables the player 114 or coach to customize a specific training regimen for the player 114. The collected data can be used for customizing the training for the specific needs of the player 114.

Figure 18:
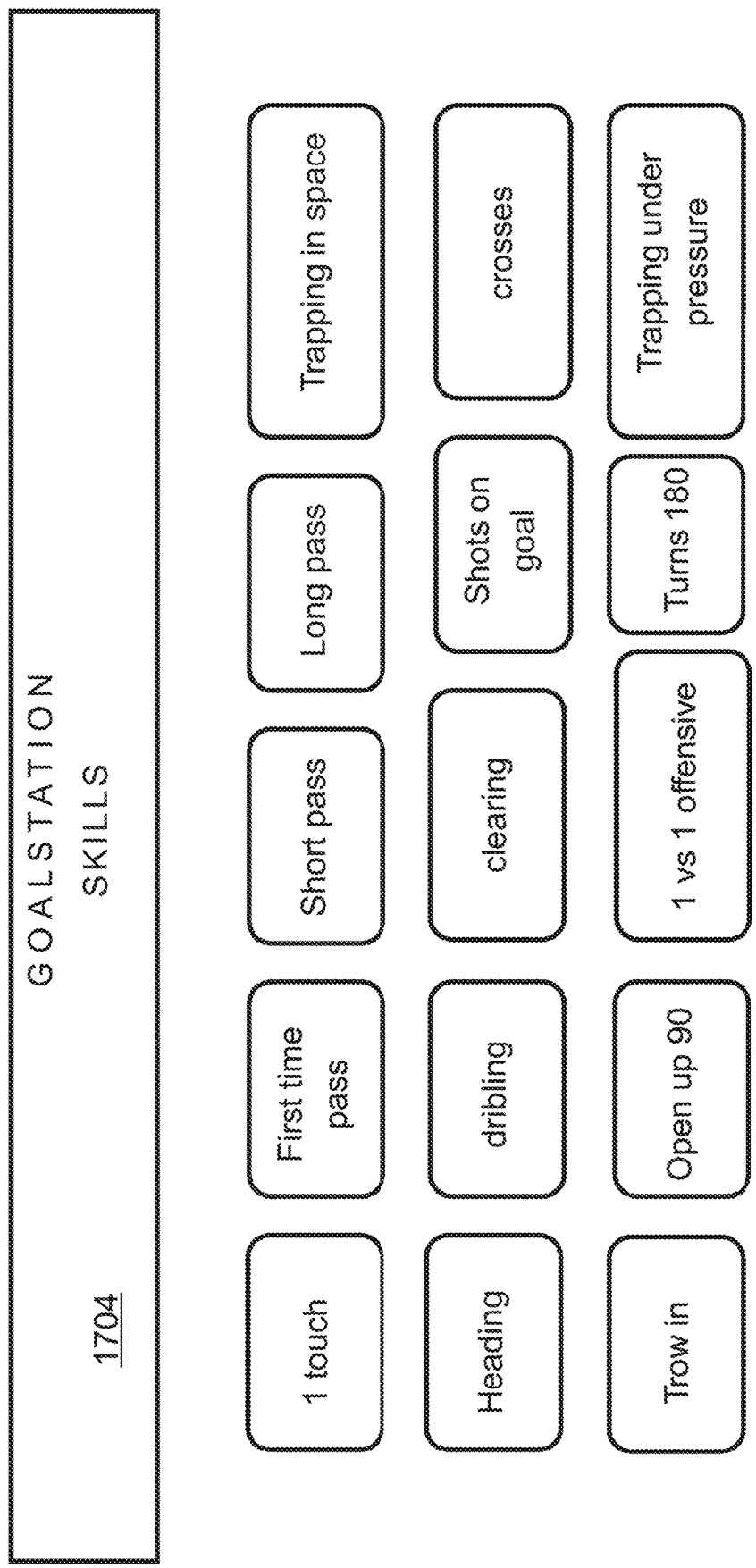
FIG. 18 illustrates the skills option selected from the training option menu, in accordance with the present invention.

FIG. 18 shows the skills option 1704 discussed above. The skills option 1704 provides access to digital or video instructions from the control system 100, and also allows the player or coach to control the modular training equipment so that the player 114 can concentrate on a specific soccer skill set. This can include inputting different types of strategic soccer positions, and soccer maneuvers. Exemplary skill sets that can be developed may include, without limitation, one touch, heading, shots on goals, 1 on 1, clearing the ball, and an athlete under pressure.

Figure 19:
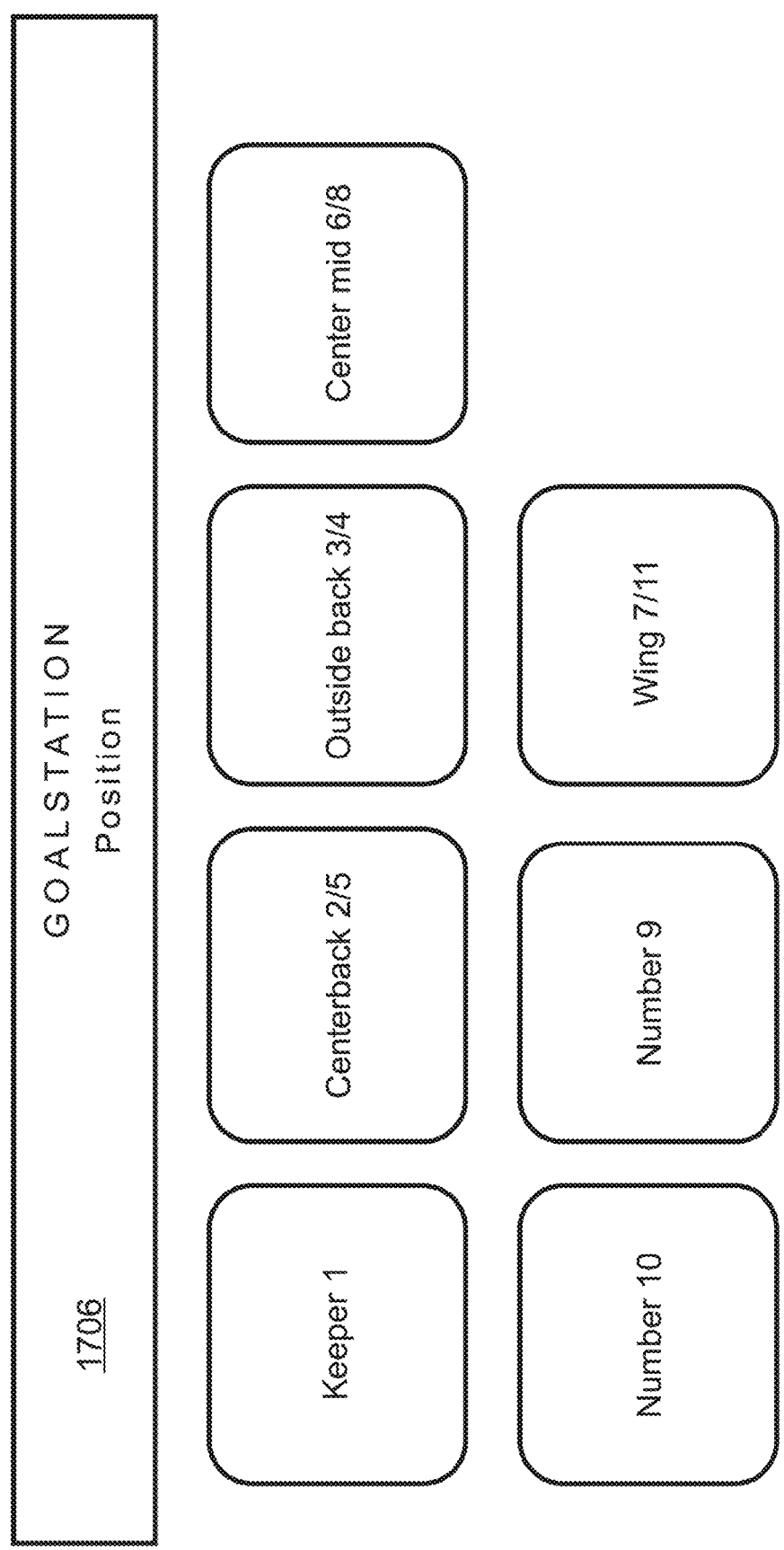
FIG. 19 illustrates the position option selected from the training option menu, in accordance with the present invention.

FIG. 19 shows the position option 1706 discussed above. The position option 1706 is enables the player or coach to train for a specific soccer position on the playing field. And provides access to the different strategic arrangements for the modular training equipment for each soccer player position.

For example, the restricted goal assembly 700 can be arranged with horizontal barriers 112*a-e* to train the goal keeper. The horizontal barriers 112*a-e* can be arranged into different defensive schemes to help a forward understand how to unlock a defensive soccer pattern. Other positions that can be trained for may include: center back 2/5, outside back 3/4, center mid 6/8, and wing 7/11. Thus, the control system 100 provides access to the entire training option menu 1700, and thereby control of the system 100 as a whole. This allows for remote and automated training by the coach, which allow for more efficient coaching of the player 114.

As discussed above, the remote data storage device is configured to receive, store, and transmit the data about the performance of the player from the sensor. The data can then be used to determine the strategic soccer position of the barriers and illuminating targets 800*a-d* on the playing field 102. This is performed through an athlete software application 2000 (Athlete app) and Web portals.

As FIG. 20 references, the Athlete app 2000 and Web portals are operable on a Goal Station Tablet, or other portable communication device known in the art. The Athlete app 2000 enables the player/athlete 114, coach, and manager to view and manipulate the training data, so as to better regulate the training equipment and training session for the player 114. Through the Athlete app 2000, the various components described above can be affected to achieve the optimal training for the player 114. The collected data is then transmitted to various Web portals that provides an organized display and storage capacity for the data, which further enhances the American soccer training experience.

For example, through the Athlete app 2000, the data can be manipulated to synchronize the lighting pattern of the illuminating targets 800*a-d* (FitLight) with the training equipment and/or the player's skillset and capacity. The illuminating targets 800*a-d* can be manipulated randomly, or based on more technical analysis, such as the capacity of the player's kicking dexterity or the speed at which the player dribbles the ball through the horizontal barriers. In yet another example, the Athlete app 2000 can be used to control data to improve the spacing between horizontal barriers 112*a-e*, based on the speed of the player 114; whereby a faster training player would have less spacing between horizontal barriers 112*a-e*.

In yet another example, the Athlete app 2000 can manipulate the data to regulate the illuminating targets 800*a-d* that are attached to the ball rebounding corral 104 for a first soccer training session, and regulate the lighting on the restricted goal assembly 700 for a second training session. The Athlete app 2000 can also be used to direct the velocity and frequency of balls being served by the ball serving assembly 1200. Myriad combinations of lighting and ball serving may be created for training purposes through use of the Athlete app 2000. This allows for a creative, out-of-the-box approach to training for American soccer.

As FIG. 20 shows, the data can be controlled directly from a Goal Station Tablet, or other portable communication device, that operates the Athlete app 2000 and Web portals. From the Goal Station Tablet, the data from illuminating targets 800*a-d* (FitLight) and sensors is subsequently processed and systematized into a "backend-system", which includes the Athlete app 2000 and a Web portal.

In one non-limiting embodiment, a first Web portal 2002 provides the options of connecting FitLight (illuminating targets 800*a-d*); Performance and Training; Athletes Database (data storage device); and Goal Station (restricted goal assembly 700). The player, coach, and manager can select the desired portal. For example, the Athlete Database can be selected to view past training performances by a particular player. The training session can be adapted to accommodate strengths and weaknesses of the player based on this data. Or, the FitLight option may be selected to regulate the frequency of lighting and the training equipment that illuminates.

In another example, if Goal Station is selected; a second Web Portal 2004 shows the number of possessions by a player (center back position). This gives a reference to how much training in a specific skillset the player has performed. A third Web portal 2006 shows the different levels of training available for the player. Athlete app 2000 in FIG. 20 shows that Level 1 is selected and transferred to a FitLight Web Server 2008. This Level 1 serves as User Information, which can be transferred to the first Web portal 2002 for storage in the Athletes Database.

From the FitLight Web Server 2008 the data is transferred to an administrative service, e.g., "GS" Web Server 2010. The user may utilize a Check In Swipe Card 2016 or other digital key to register. A GS app 1204 in the form of a KMD:GS Dashboard allows for viewing the data, i.e., Level of player training. The data is automatically saved and sent to the KMD:GS dashboard 1204. The user can then utilize a mobile communication device 2012 to save the data to an Admin Server or other remote server/database.

Looking now at FIG. 21, an exemplary Architecture structure 2100 used by the Athlete app 2000 and Web portal is detailed. It is important to recognize that the Web portal may be a specially designed website that brings information from the different sensors and illuminating targets 800*a-d* and integrate these to be viewed by the athletes, trainers, clubs, and agents. Further, the Athlete app 2000 may be a customized sports training computer program designed to run on a mobile device such as a phone/tablet or watch; and which allows for access to the Web portal, and control of the various illuminating targets 800*a-d* and sensors.

The Athlete app 2000 and Web portal help the athlete/player, trainer, and manager to determine the level of performance; along with ranking and benchmarks for the player. For example, the speed at which multiple players strikes an illuminated target is recorded and used to rank the players. In this manner, the Athlete app 2000 and Web portal provide valuable insights the athletes—and trainers, clubs and agents—based on the performance data, including detailed analysis, ranking and benchmarking. These help the player develop soccer-related motor skills and techniques.

The Athlete app 2000 and Web portal is also a useful tool for recording historical training performances and comparing to present training. This can also be used to plan future Soccer training programs. This allows for benchmarking or comparing current users/players to past players/statistics so that the admin (e.g., a soccer team) can statistically evaluate them through the Athlete app. For example, if a player kicked 60% of the balls through the restricted goal assembly 700 in a prior month, and then kicks 75% in a subsequent month; progress is evident. The admin may then increase the velocity of the ball from the ball serving assembly to increase the challenge to the player. Or the coach may increase training in another skill set, such as dribbling the ball.

The Athlete app 2000 and Web portal is also useful for deriving how much money/time has been invested and whether it is paying off, i.e., figuring out or measuring the admin's return on investment. For example, if the player shows only minimal progress over a 6-month span, the player or admin may consider ceasing the training program. This profitability analysis feature helps the admin create greater profits, as to know how to target the player and unsigned players to the training program.

In one embodiment, the Athlete app 2000 communicates with the sensor that monitors the motion and position of the player and the ball on the playing field. The collected data can be used to derive data, attributes, and characteristics that are used to control light patterns for the illuminating targets and ball serving by the ball serving assembly. And the data, attributes, and characteristics are stored in a remote data storage device for analysis, distribution, and to develop a customized training program for the player. All of this is viewable through the Web portal.

In one exemplary use of the Athlete app 2000, the sensor connects to the ball serving assembly 1200 to control when to serve the ball 116 to the player 114 for taking a shot or blocking a shot. As data is produced, the Athlete app 2000 commands the ball serving assembly 1200 to serve the ball 116 accordingly. The Athlete app 2000 also is used to increase the frequency of illumination of the illuminating targets 800*a-d*, so as to create a more (or less) challenging kicking parameter for the player. Then, through the Web portal, the data can then be analyzed to design a specific soccer training regimen for the player 114.

This control of data and training equipment through the Athlete app 2000 is operable for multiple user types with different features. For example, athletes (users), trainer/club (customers) and GS (administration). Furthermore, users across multiple trainer/clubs can use the Athlete app 2000. Further, users might train with various trainers/coaches, shift between clubs or similar "Advanced" reporting.

Advantages of using the Athlete app 2000 and Web portal in this manner is that both users and customers are provided with a broader range of reporting suited for their needs to evaluate performance over time, team etc. Another advantage is that the users receive the option of benchmarking their performance on official training drills with the other users across age groups, gender etc.

The Athlete app 2000 also allows for integrations between illuminating targets 800a-d (FitLight) and GS; allows for customer management; allows users to link to customer; Allows for extraction of performance data; allows for pushing of new or updated training drills; and allows for customer management.

As discussed above, FIG. 21 illustrates an exemplary Architecture structure 2100 used by the Athlete app 2000 and Web portals shown in FIG. 20. The Architecture 2100 provides a high-level structures of the software system, the discipline of creating the American soccer training, and the documentation of the data during training for American soccer. Each architectural structure comprises software elements, relations among them, and properties for training.

For example, in one embodiment, a local architecture structure 2102 allows for communication between the FitLights (illuminating targets 800a-d) on the playing field, and the FitLight app, described above. The FitLight app regulates lighting frequency and intensity. Also, the type of training equipment that is light is regulated by the FitLight app. In another embodiment, A FitLight architecture structure 2104 allows the FitLight app to transmit data selected by the user to a FitLight web server. The FitLight web server may then transfer this data to a GS web server.

Continuing with the Architecture structure 2100, a GS architectural structure 2106 provides a GS app that is used to view and control the data in the GS. A GS Web portal is also used to view this data from the GS app. From the GS web server defined in architecture 2104, a GS BI server can receive the data in a GS BI architecture structure 2108.

The GS-version of the Athlete app 2000, in regards to the illuminating targets 800a-d (FitLight) and sensors is expected to contain a standard setup with a number of predefined training drills. It must be possible to maintain these drills on the FitLight Athlete app 2000 with a minimum of manual work, and it must also be possible to push new drills to the Athlete app 2000. It is significant to note that this functionality is regarded as "nice to have" in the first version and might be postponed for a later release.

Nonetheless, the GS BI server could be utilized for viewing, storage, and analysis of the training data performance of the player 114. This is viewable in an analysis platform architecture structure 2110. In the analysis platform architecture structure 2110, a GS analysis portal is used to view the data. And a GS data export is used to store the data for further processing or later viewing. It is significant to note that the recorded performance data must be extracted to the GS web server backend for data preparation. The performance data is be transferred to the GS Analysis Platform from the GS web server backend. This is effective for pushing new or updated training drills.

This integrations between FitLight and GS provide many advantages, including: customer management; link users to customer; extracts performance data; and pushes new or updated training drills. For the customer management advantage, the FitLight and GS integration ensures that performance and master data flows correctly between the FitLight and GS platforms, there must be implemented a structured customer management functionality on the GS platform which can control this flow (push and pull). In addition to control the flow of performance data the customer management must include logic to manage the following master data: Link between the GS customer and the FitLight user; Link between the GS end user and the FitLight athlete (refer to next section); and Master data on drills, both official and user defined.

For linking users to customers advantage, the FitLight and GS integration ensures that users train with various trainers/ coaches, shift between clubs or similar. Therefore, it must be possible for multiple customers to record performance data on the same user, making it possible for the user to have all recorded data shown on their GS-profile.

For extracting performance data advantage, the recorded performance data must be extracted to the GS web server backend for data preparation. The performance data will be transferred to the GS Analysis Platform from the GS web server backend. For pushing new training advantage, the GS-version of the FitLight app is expected to contain a standard setup with a number of predefined training drills. It must be possible to maintain these drills on the FitLight app with a minimum of manual work, and it must also be possible to push new drills to the Athlete app 2000.

Although the invention is illustrated and described herein as embodied in an American soccer training system, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the athlete appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any athlete appropriately detailed structure.

Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. As used herein, the terms "about" or "athlete approximately" athlete apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

Figure 25:
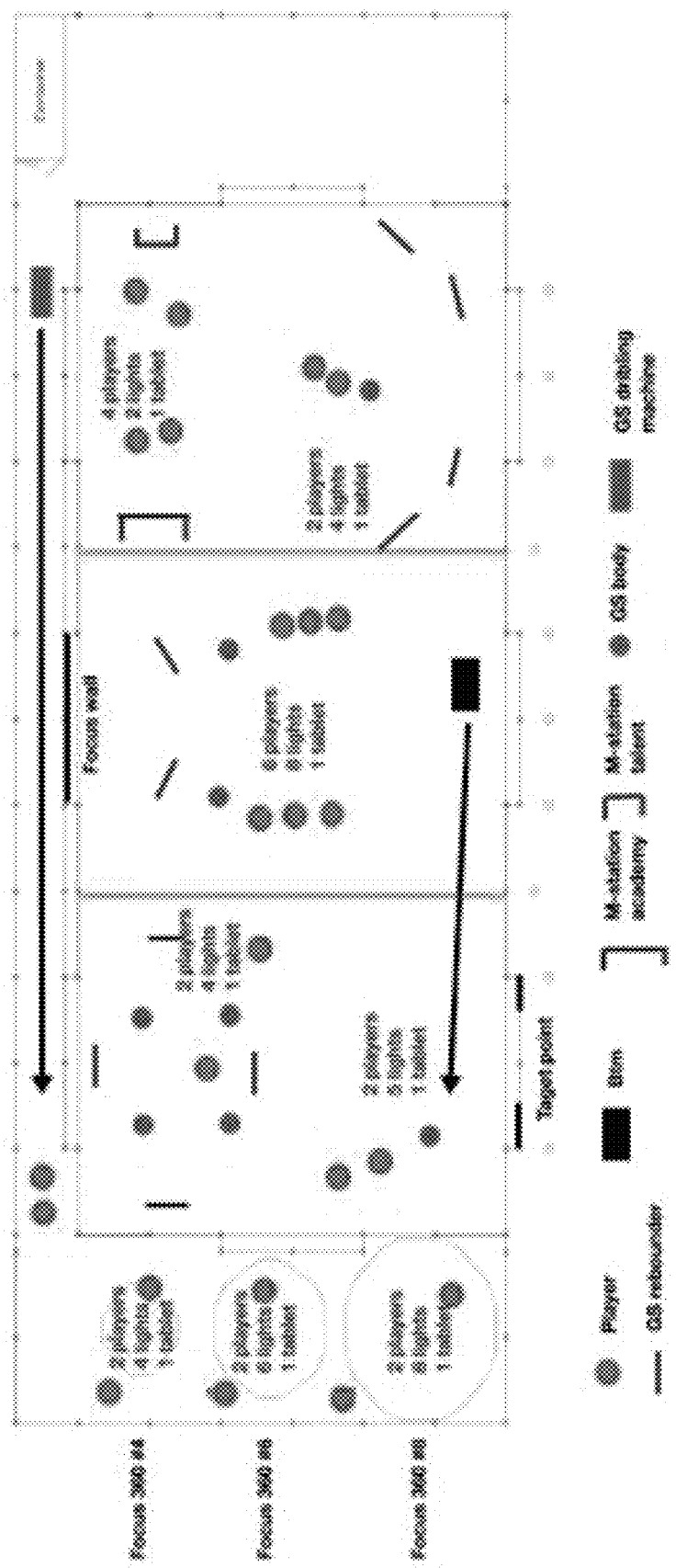
FIG. 25 illustrates another exemplary embodiment of a training field/configuration in accordance with another embodiment of the present invention.
Figure 26:
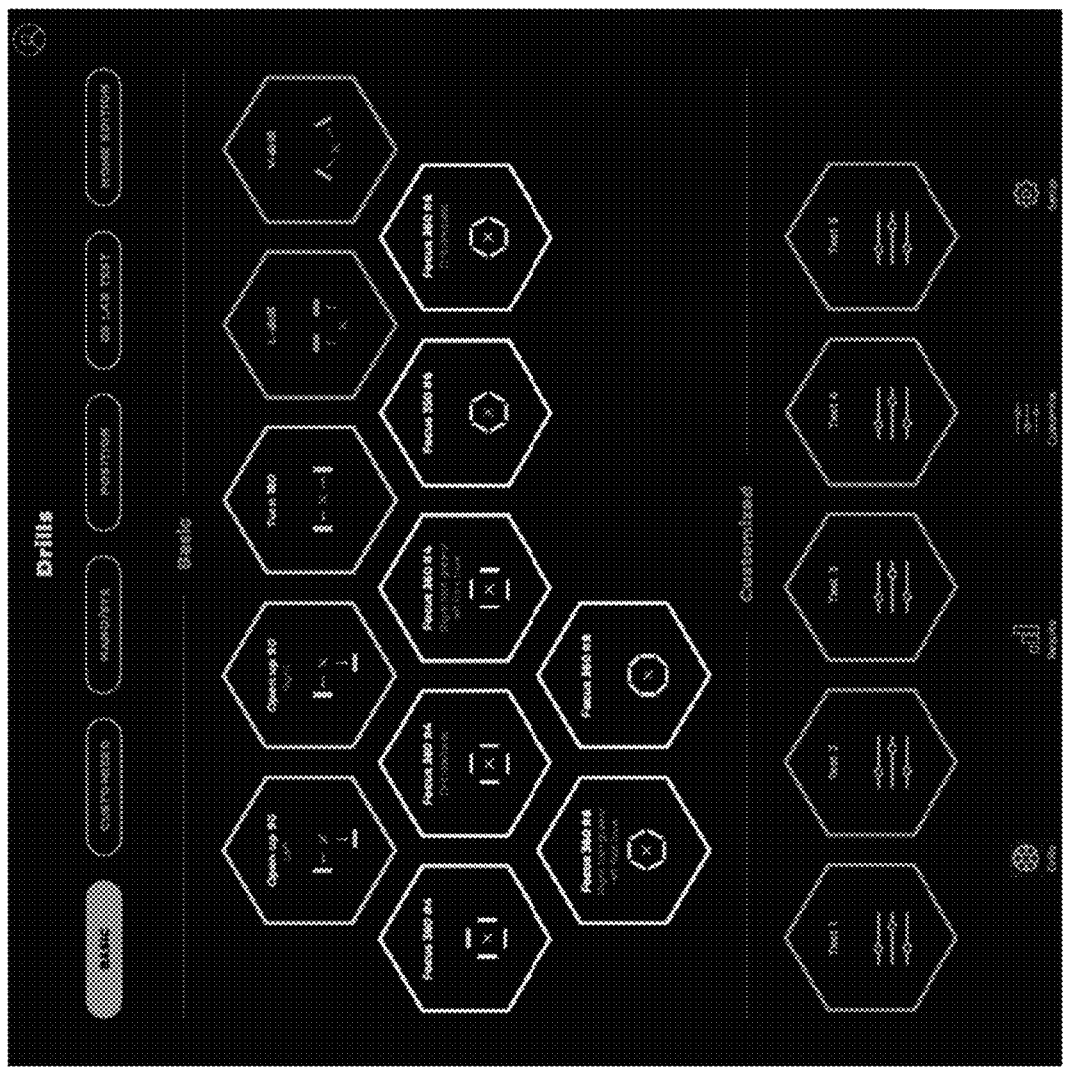
FIG. 26 illustrates an exemplary user-interface of a software application implemented to carry out one or more aspects of the present invention.

With reference to FIG. 25, another version of a training field with individuals training stations can be seen. As discussed above, each station may include ten or more variations to drills.

The invention claimed is:

1. A computer-implemented American soccer training and evaluation method comprising:
   providing a plurality of American soccer drilling assemblies placed on a training field surface that includes a plurality of mobile vertical barriers arranged on, and in an upright orientation with respect to, the training field surface, and a plurality of mobile horizontal barriers arranged on, and in an upright orientation with respect to, the training field surface and each with a generally flat surface and a width wider than a width of the plurality of mobile vertical barriers, and each having a unique structural drilling configuration and a unique and pre-defined drilling protocol and at least one sensor operably coupled thereto, the at least one sensor operably configured to obtain at least one user physical characteristic and communicate the at least one user physical characteristic to an administrative server, of an administrator user, communicatively coupled to the at least one sensor over a network, the at least one user physical characteristic of at least one of a plurality of user physical characteristics that includes: leg speed, ball speed, ball placement accuracy, and drilling protocol completion time;
   subjecting a drilling user to each unique and pre-defined drilling protocol of the plurality of American soccer drilling assemblies and obtain, from each pre-defined drilling protocol of the plurality of American soccer drilling assemblies and from the at least one sensor, the at least one user physical characteristic of the drilling user;
   communicating the at least one user physical characteristic of the drilling user from each of the plurality of American soccer drilling assemblies to the administrative server over the network;
   storing the at least one user physical characteristic of the drilling user from each of the plurality of American soccer drilling assemblies on the server and creating a drilling user performance profile having individualized performance comparisons with respect to the at least one user physical characteristic of the drilling user obtained from each of the plurality of American soccer drilling assemblies and a performance benchmark associated with each of the plurality of American soccer drilling assemblies; and
   communicating the drilling user performance profile.

2. The computer-implemented American soccer training and evaluation method according to claim 1, further comprising:
   registering the drilling user with a drilling user account resident on the administrative server, the administrative server having a plurality of drilling user accounts resident thereon; and
   associating the drilling user performance profile with one of the plurality of drilling user accounts.

3. The computer-implemented American soccer training and evaluation method according to claim 2, further comprising:
   subjecting the drilling user to each pre-defined drilling protocol of the plurality of American soccer drilling assemblies and obtain, from each pre-defined drilling protocol of the plurality of American soccer drilling assemblies and from the at least one sensor, the at least one user physical characteristic of the drilling user, wherein the at least one user physical characteristic is utilized in determining the performance benchmark.

4. The computer-implemented American soccer training and evaluation method according to claim 3, wherein:
   the performance benchmark is an average of a pre-defined number of the at least one user physical characteristic of the drilling user obtained from each of the plurality of American soccer drilling assemblies.

5. The computer-implemented American soccer training and evaluation method according to claim 1, further comprising:
   subjecting the drilling user to a first performance evaluation session that includes subjecting the drilling user to each pre-defined drilling protocol of the plurality of American soccer drilling assemblies and obtain, from each pre-defined drilling protocol of the plurality of American soccer drilling assemblies and from the at least one sensor, the at least one user physical characteristic of the drilling user obtained from each of the plurality of American soccer drilling assemblies in the first performance evaluation session is utilized in determining the performance benchmark for each of the plurality of American soccer drilling assemblies; and
   subjecting the drilling user to a second performance evaluation session that includes subjecting the drilling user to each, and the same from the first performance evaluation session, pre-defined drilling protocol of the plurality of American soccer drilling assemblies and obtain, from each pre-defined drilling protocol of the plurality of American soccer drilling assemblies and from the at least one sensor, the at least one user physical characteristic of the drilling user.

6. The computer-implemented American soccer training and evaluation method according to claim 1, further comprising:
   initiating a timed performance session before subjecting the drilling user to each pre-defined drilling protocol of the plurality of American soccer drilling assemblies and, upon completion of all the pre-defined drilling protocols of the plurality of American soccer drilling assemblies, ascertaining a performance session completion time, the performance session completion time one of the plurality of user physical characteristics.

7. The computer-implemented American soccer training and evaluation method according to claim 1, wherein the unique structural drilling configuration and the unique and pre-defined drilling protocol of the American soccer drilling assemblies include:
   a ball rebounding corral having a plurality of wall modules arranged in a closed, angular 360° pattern forming an enclosed region, the enclosed region sized and dimensioned to contain a ball and a player;
   the mobile horizontal barriers comprising at least one mobility mechanism configured to enable mobility; and
   a restricted goal assembly comprising a frame, a net, and a generally cross-shaped panel extending across the frame, the orientation of the cross-shaped panel across the frame forming multiple corner target zones.

8. A computer-implemented American soccer training and evaluation method comprising:

providing a plurality of American soccer drilling assemblies operably configured to be placed on a training field surface, that include a plurality of mobile barriers, and each having a unique structural drilling configuration and a unique and pre-defined drilling protocol and at least one sensor operably coupled thereto, the at least one sensor operably configured to obtain at least one user physical characteristic and communicate the at least one user physical characteristic to an administrative server, of an administrator user, communicatively coupled to the at least one sensor over a network, the at least one user physical characteristic of at least one of a plurality of user physical characteristics that includes: leg speed, ball speed, ball placement accuracy, and drilling protocol completion time;

subjecting a drilling user to each unique and pre-defined drilling protocol of the plurality of American soccer drilling assemblies and obtain, from each pre-defined drilling protocol of the plurality of American soccer drilling assemblies and from the at least one sensor, the at least one user physical characteristic of the drilling user;

communicating the at least one user physical characteristic of the drilling user from each of the plurality of American soccer drilling assemblies to the administrative server over the network;

storing the at least one user physical characteristic of the drilling user from each of the plurality of American soccer drilling assemblies on the server and creating a drilling user performance profile having individualized performance comparisons with respect to the at least one user physical characteristic of the drilling user obtained from each of the plurality of American soccer drilling assemblies and a performance benchmark associated with each of the plurality of American soccer drilling assemblies; and communicating the drilling user performance profile.

* * * * *